US007269601B2

(12) United States Patent
Kinno et al.

(10) Patent No.: US 7,269,601 B2
(45) Date of Patent: Sep. 11, 2007

(54) INFORMATION DELIVERY SYSTEM, INFORMATION DELIVERY METHOD, INFORMATION DELIVERY SERVER, CONTENT DELIVERY SERVER AND CLIENT TERMINAL

(75) Inventors: Akira Kinno, Yokohama (JP); Minoru Etoh, Yokohama (JP); Yoshifumi Yonemoto, Yokohama (JP); Shunichi Sekiguchi, Yamato (JP)

(73) Assignee: NTT DoCoMo, Inc., Tokyo (JP)

( * ) Notice: Subject to any disclaimer, the term of this patent is extended or adjusted under 35 U.S.C. 154(b) by 367 days.

(21) Appl. No.: 10/359,662

(22) Filed: Feb. 7, 2003

(65) Prior Publication Data

US 2003/0154217 A1 Aug. 14, 2003

(30) Foreign Application Priority Data

Feb. 8, 2002 (JP) ............................ P2002-033186
Apr. 11, 2002 (JP) ............................ P2002-109620

(51) Int. Cl.
*G06F 17/30* (2006.01)

(52) U.S. Cl. ........................... 707/104.1; 707/3; 707/5; 707/6; 707/10

(58) Field of Classification Search .................... 707/3, 707/104.1, 102; 715/720; 386/96; 725/37, 725/81
See application file for complete search history.

(56) References Cited

U.S. PATENT DOCUMENTS

| 5,737,552 | A | * | 4/1998 | Lavallee et al. ............ 715/720 |
| 6,370,316 | B1 | * | 4/2002 | Yamada et al. ............... 386/46 |
| 7,134,074 | B2 | * | 11/2006 | Munetsugu et al. ........ 715/513 |
| 2001/0018769 | A1 | * | 8/2001 | Matsui ......................... 725/87 |
| 2002/0019699 | A1 | * | 2/2002 | McCarty et al. ............ 701/211 |
| 2002/0152460 | A1 | * | 10/2002 | Soloff .......................... 725/14 |
| 2003/0003861 | A1 | * | 1/2003 | Kagemoto et al. ......... 455/3.01 |

\* cited by examiner

*Primary Examiner*—Cam Y T Truong
(74) *Attorney, Agent, or Firm*—Oblon, Spivak, McClelland, Maier & Neustadt, P.C.

(57) ABSTRACT

The information delivery system is configured with a media database 1009 which stores media data, a sequence information database 1008 which stores sequence information for specifying the address of media data to deliver, a scene searcher 1005 which verifies the sequence information according to a request of the controlling media received from client terminal 1000 and retrieves appropriate media data from the media database 1009 starting from a prescribed point based on a result of the verification, and an output unit 1006 which delivers the retrieved media data to the client terminal 1000.

6 Claims, 29 Drawing Sheets

| | | |
|---|---|---|
| C → S: | PLAY rtsp://server/mediastream RTSP/1.0 | ... PLAY COMMAND(SPECIFYING URI) |
| | CSeq:4 | ... COMMAND SEQUENCE No. |
| | Range:npt=1800- → CLIENT TERMINAL NEEDS TO KNOW THE Range WHEN REQUEST | ... RANGE SPECIFIED |
| | Session:12345678 | ... SESSION No. |
| S → C: | RTSP/1.0 200 OK | ... RESPONSE MESSAGE |
| | CSeq:4 | ... COMMAND SEQUENCE No. |
| | Session:12345678 | ... SESSION No. |
| S → C: | RTP(video) | ... DELIVERING VIDEO |
| | RTP(audio) | ... DELIVERING AUDIO |
| C → S: | RTCP | ... RESPONSE |

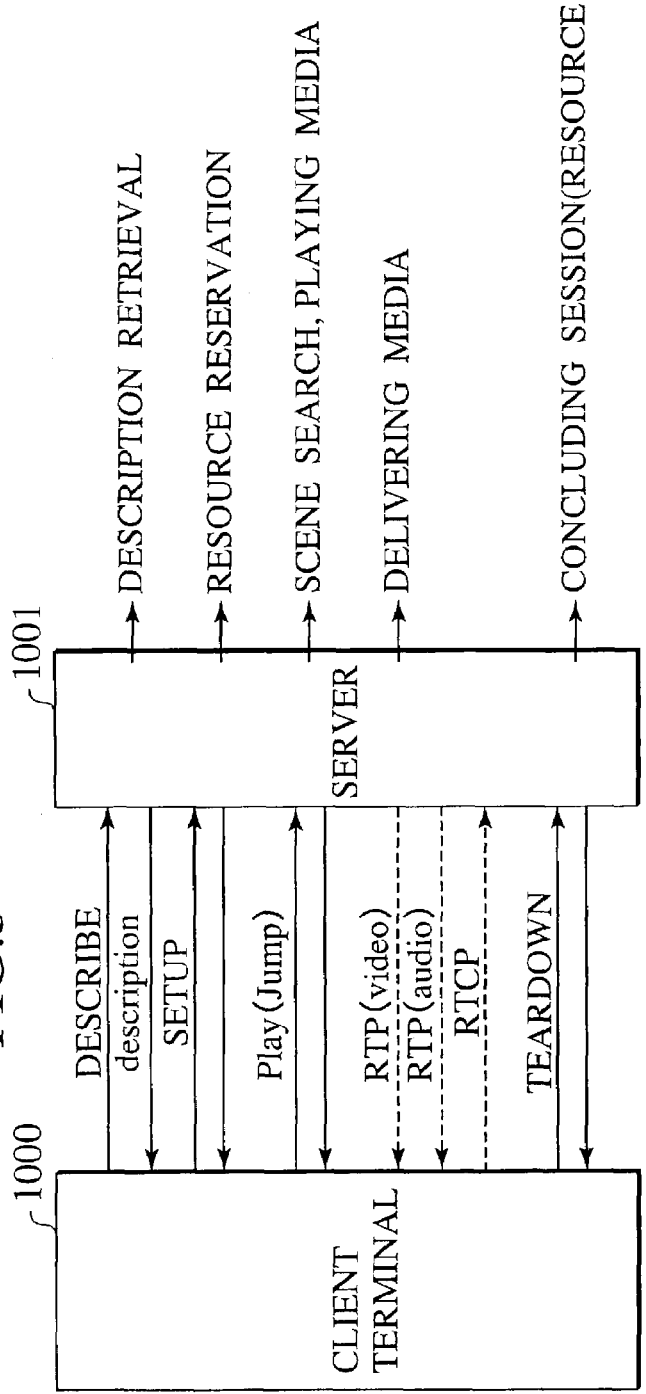

FIG.7

| | | |
|---|---|---|
| C → S: | PLAY rtsp://server.example.com/mediastream RTSP/1.0 | ···PLAY COMMAND(SPECIFYING URI) |
| | CSeq:4 | ···COMMAND SEQUENCE No. |
| | Jump:playtime=34.5, Scene=(+1) | ···Jump REQUEST(PLAYTIME, SCENE) |
| | Session:12345678 | ···SESSION No. |
| | | |
| S → C: | RTSP/1.0 200 OK | ···RESPONSE MESSAGE |
| | CSeq:4 | ···COMMAND SEQUENCE No. |
| | Session:12345678 | ···SESSION No. |
| | Range:npt = 45.2- | ···RANGE PROCESSED |
| | | |
| S → C: | RTP(video) | ···DELIVERING VIDEO |
| | RTP(audio) | ···DELIVERING AUDIO |
| | | |
| C → S: | RTCP | ···RESPONSE |

FIG.8

| | |
|---|---|
| C → S: PLAY rtsp://server.example.com/mediastream RTSP/1.0 | ...PLAY COMMAND(SPECIFYING URI) |
| CSeq:4 | ...COMMAND SEQUENCE No. |
| Jump:playtime=34.5, Scene=(+1) | ...Jump REQUEST(PLAYTIME, SCENE) |
| Session:12345678 | ...SESSION No. |
| | |
| S → C: RTSP/1.0 200 OK | ...RESPONSE MESSAGE |
| CSeq:4 | ...COMMAND SEQUENCE No. |
| Session:12345678 | ...SESSION No. |
| Jump:playtime = 34.5, Synchronise Error | ...ERROR MESSAGE (SYNCHRONISATION FAILED) |

FIG.9

```
C → S: PLAY rtsp://server.example.com/mediastream RTSP/1.0   ...PLAY COMMAND(SPECIFYING URI)
       CSeq:4                                                 ...COMMAND SEQUENCE No.
       Jump:playtime=34.5, Scene=(+1)                         ...Jump REQUEST(PLAYTIME, SCENE)
       Session:12345678                                       ...SESSION No.

S → C: RTSP/1.0 200 OK                                        ...RESPONSE MESSAGE
       CSeq:4                                                 ...COMMAND SEQUENCE No.
       Session:12345678                                       ...SESSION No.
       Jump:send already                                      ...ERROR MESSAGE
       Range:npt = 45.2-                                         (SCENE ALREADY TRANSMITTED)
```

FIG.10

```
C → S: PLAY rtsp://server.example.com/mediastream RTSP/1.0     ···PLAY COMMAND(SPECIFYING URI)
       CSeq:4                                                   ···COMMAND SEQUENCE No.
       Jump:playtime=34.5, Scene=(+1)                           ···Jump REQUEST(PLAYTIME, SCENE)
       Session:12345678                                         ···SESSION No.

S → C: RTSP/1.0 200 OK                                          ···RESPONSE MESSAGE
       CSeq:4                                                   ···COMMAND SEQUENCE No.
       Session:12345678                                         ···SESSION No.
       Jump:playtime=34.5, Scene=(+1), Search Error             ···ERROR MESSAGE(SEARCH FAILED)
```

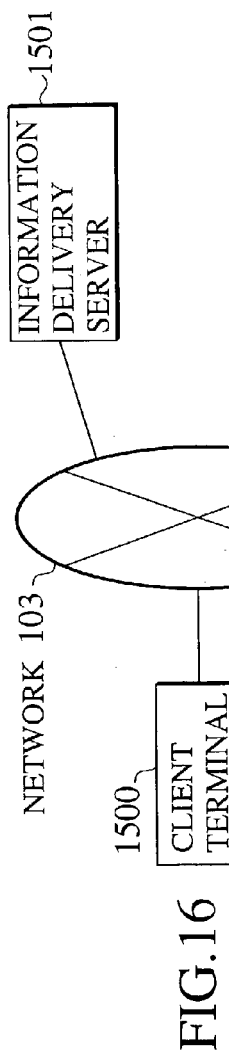
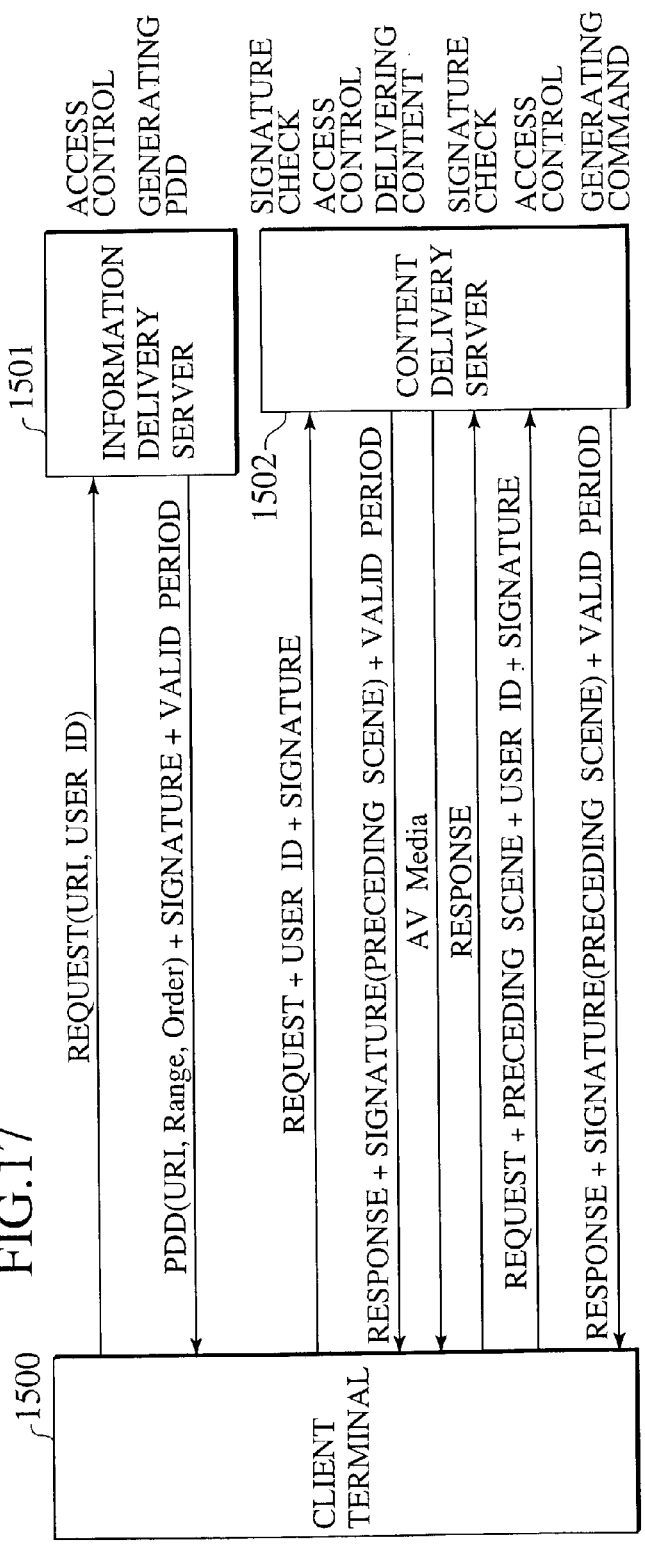

FIG.22

```
<?xml version = "1.0" encoding = "euc-jp"?>
<PolicyRuleDescription>                                        ...POLICY RULE SETTING
    <PolicyRule>                                               ...POLICY RULE 1
        <subject> "All" </subject>                             ...SPECIFYING SUBJECT
        <object>                                               ...SPECIFYING OBJECT
            <uri> www.foo.com/sample.mp4 </uri>                ...SPECIFYING LOCATION OF OBJECT
            <range>                                            ...SPECIFYING RANGE
                <MediaTime>
<MediaTimePoint> T00:01:13 </MediaTimePoint>
<MediaDuration> PT27S2N30F </MediaDuration>
                </MediaTime>
            </range>
            <order>                                            ...SPECIFYING ORDER
                <priority score = 1/>
            </order>
        </object>
        <sign> + </sign>                                       ...SPECIFYING PERMISSION
    </PolicyRule>
    <PolicyRule>                                               ...POLICY RULE 2
        <subject> "Guest" </subject>                           ...SPECIFYING SUBJECT
        <object>                                               ...SPECIFYING OBJECT
            <uri> www.foo.com/sample.mp4 </uri>                ...SPECIFYING LOCATION OF OBJECT
            <range>                                            ...SPECIFYING RANGE
                <MediaTime>
<MediaTimePoint> T00:01:23 </MediaTimePoint>
<MediaDuration> PT17S16N30F </MediaDuration>
                </MediaTime>
            </range>
        </object>
        <sign> - </sign>                                       ...SPECIFYING PERMISSION
    </PolicyRule>
</PolicyRuleDescription>
```

FIG.23

```
<?xml version = "1.0" encoding = "euc-jp"?>
<!DOCTYPE Mpeg7Main SYSTEM "MPEG7_Contents.dtd">
<Mpeg7Main id = "V17" version = "3.3.1">                          ...MPEG-7 SETTING
    <Audio VisualDescription>
        <Audio Visual id = "Program">                              ...SPECIFYING
            <MediaInformation>                                        AV DATA
                MediaInformation, DESCRIBING URI AND ENCODING LAW ...SPECIFYING
            </MediaInformation>                                       MEDIA
            <SegmentDecomposition DecompositionType = "temporal">     INFORMATION
                <AudioVisualSegment id = "Seg0">
                    <PointOfView viewPoint = "ARASHIYAMA">         ...SPECIFYING
                        <Value> 1.0 </Value>                          DIGEST OF
                    </PointOfView>                                    SCENE
                    <PointOfView viewPoint = "YELLOW LEAVES">
                        <Value> 1.0 </Value>
                    </PointOfView>
                    <PointOfView viewPoint = "THIS WEEK">
                        <Value> 1.0 </Value>
                    </PointOfView>
                    <MediaTime>                                    ...SPECIFYING DURATION
                        <MediaTimePoint> T00:01:13:14F30 </MediaTimePoint>  ...STARTING TIME
                        <MediaDuration> PT1M00S </MediaDuration>   ...SCENE DURATION
                    </MediaTime>
                </AudioVisualSegment>                              ...SPECIFYING SEQUENCE
                <MediaTime>
                    <MediaTimePoint> T00:00:00:0F30 </MediaTimePoint>
                    <MediaDuration> PT1M </MediaDuration>
                </MediaTime>
            </SegmentDecomposition>
        </Audio Visual>
    </Audio VisualDescription>
</Mpeg7Main>
```

FIG.24

```
<smil xmlns = "smil20 = "http://www.w3.org/2000/SMIL20">      ...SMIL SETTING
<head>
  <layout>                                                    ...SPECIFYING LAYOUT
    <root-layout id = "root" width = "352" height = "338" background-color = "black"/>
    <region id = "movie" top = "5" left = "0" width = "352" height = "328"/>
  </layout>
  <meta name = "title" content = "kouyou"/>
</head>
<body>
  <seq>
    <par>                                                     ...Par : UNIT OF PLAYBACK
      <video region = "movie" src = "rtsp://www.foo.com/sample.mp4"   ...VIDEO DATA
        clip-begin = "0.0s" clip-end = "60.0s"/>
      <audio region = "movie" src = "rtsp://www.foo.com/sample.mp4"   ...AUDIO DATA
        clip-begin = "0.0s" clip-end = "60.0s"/>
    </par>
  </seq>
</body>
</smil>
```

FIG.25

```
<?xml version = "1.0" encoding = "euc-jp"?>
<!DOCTYPE Mpeg7Main SYSTEM "MPEG7_Contents.dtd">
<Mpeg7Main id = "V17" version = "3.3.1">                    ...MPEG-7 SETTING
    <Audio VisualDescription>                               ...SPECIFYING AV DATA
        <Audio Visual id = "Program">
            <MediaInformation>
                MediaInformation
            </MediaInformation>
            <SegmentDecomposition DecompositionType = "temporal">
                <AudioVisualSegment id = "Seg0">
                    <PointOfView viewPoint = "ARASHIYAMA">
                        <Value> 1.0 </Value>
                    </PointOfView>
                    <PointOfView viewPoint = "YELLOW LEAVES">
                        <Value> 1.0 </Value>
                    </PointOfView>
                    <PointOfView viewPoint = "THIS WEEK">
                        <Value> 1.0 </Value>
                    </PointOfView>
                    <MediaTime>
                        <MediaTimePoint> T00:01:13:14F30 </MediaTimePoint>  ...STARTING TIME
                        <MediaDuration> PT15S </MediaDuration>  ...SCENE
                    </MediaTime>                                    DURATION
                </AudioVisualSegment>                               (DURATION CHANGED
            </SegmentDecomposition>                                 DUE TO ACCESS
            <MediaTime>                                             CONTROL)
                <MediaTimePoint> T00:00:00:0F30 </MediaTimePoint>
                <MediaDuration> PT15S </MediaDuration>  ...TOTAL
            </MediaTime>                                    DURATION
        </Audio Visual>                                     (DURATION CHANGED
    </Audio VisualDescription>                              DUE TO ACCESS
</Mpeg7Main>                                                CONTROL)
```

FIG.26

```
<smil xmlns = "smil20 = "http://www.w3.org/2000/SMIL20">        ...SMIL SETTING
<head>
<layout>
<root-layout id = "root" width = "352" height = "338" background-color = "black"/>
<region id = "movie" top = "5" left = "0" width = "352" height = "328"/>
</layout>
<meta name = "title" content = "kouyou"/>
</head>
<body>
<seq>
<par>
<video region = "movie" src = "rtsp://www.foo.com/sample.mp4"      ...VIDEO DATA
    clip-begin = "0.0s" clip-end = "15.0s"/>                       (DURATION CHANGED DUE TO
                                                                    ACCESS CONTROL)
<audio region = "movie" src = "rtsp://www.foo.com/sample.mp4"      ...AUDIO DATA
    clip-begin = "0.0s" clip-end = "15.0s"/>                       (DURATION CHANGED DUE TO
                                                                    ACCESS CONTROL)
</par>
</seq>
</body>
</smil>
```

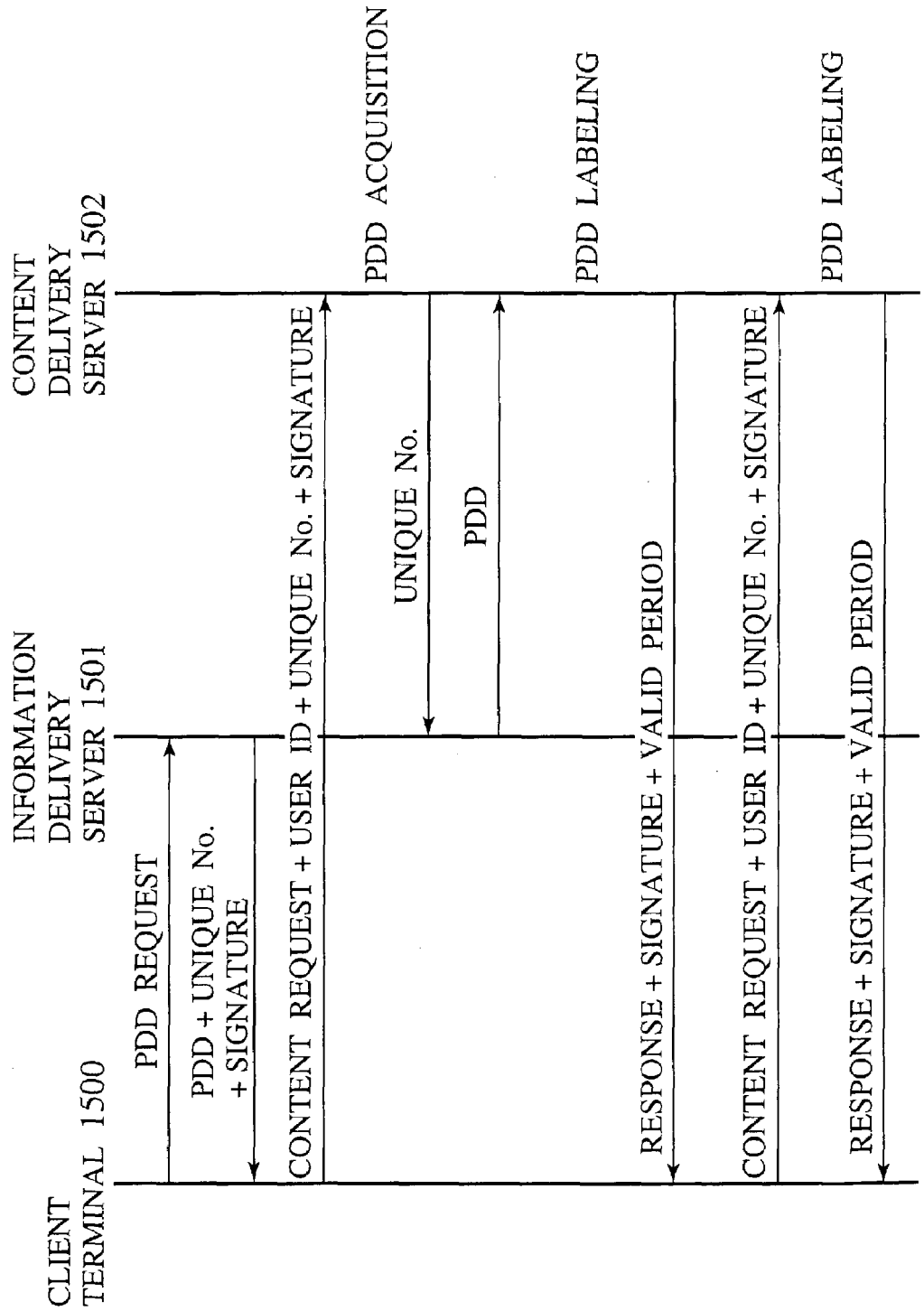

INFORMATION DELIVERY SYSTEM, INFORMATION DELIVERY METHOD, INFORMATION DELIVERY SERVER, CONTENT DELIVERY SERVER AND CLIENT TERMINAL

CROSS REFERENCE TO RELATED APPLICATIONS

This application is based upon and claims the benefit of priority from the prior Japanese Patent Applications No. P2002-33186, filed on Feb. 8, 2002 and P2002-109620, filed on Apr. 11, 2002; the entire contents of which are incorporated herein by reference.

BACKGROUND OF THE INVENTION

1. Field of the Invention

The present invention relates generally to multimedia data such as audio and video, and more particularly to multimedia data allowing user customization and user access control.

2. Description of the Related Art

Due to the fact that networks have become speedier and client terminals have become highly sophisticated, the delivery of multimedia contents (e.g., audio, video) is now an important technological factor in a wide area network, e.g., the Internet. RTSP (IETF RFC2326), which is a control protocol of a multimedia stream, is one of these factors. RTSP is capable of the remote control, e.g., "PLAY", "RECORD" and "STOP", of a media stream which resides in a server by transmitting RTSP commands from a user to the server via a network.

FIG. 1 shows conventional art regarding the present invention. That is, a schematic diagram describing a controlling method of a media stream, which resides in a server using RTSP.

As shown in FIG. 1, a client terminal 100 which is to retrieve media, and a media server 101 which is to deliver the media, are interconnected via a network 103. The media server 101 is further connected to a media 102 where media is stored. The client terminal 100 remotely controls media stored in the media 102 through the media server 101 and the network 103. More specifically, the client terminal 100 transmits an RTSP request to the media server 101. The media server 101 prepares to control media stored in the media 102 as soon as the RTSP request is accepted and transmits an RTSP response to the client terminal 100.

FIG. 2 shows a sequence chart regarding the remote control of a media stream which resides in a server using RTSP. In FIG. 2, the client terminal 100 which is to retrieve media, and the media server 101 which is to deliver the media, are shown.

The client terminal 100 first transmits a "DESCRIBE" message to the media server 101, which means a request to retrieve the description of a media stream, in order to control media using RTSP. The media server 101 transmits the description of an appropriate media stream to the client terminal 100 according to the request. The client terminal 100 then transmits a "SETUP" message to the media server 101, which means a request to reserve resources. The media server 101 reserves resources and transmits a response message to the client terminal 100 according to the request. The client terminal 100, as soon as the response received, recognizes that the controlling of the media is now possible, and transmits "PLAY", "RECORD" or "PAUSE" commands to the media server 101 in order to control the media.

The media server 101 prepares to control the media according to the command and then transmits a response message for the command. Further, the media server 101 controls the media according to the received command. Finally, the client terminal 100 transmits a "TEARDOWN" message to the media server 101 so as to conclude the session.

There are "RANGE", which specifies a timeframe of a media stream to be controlled, and "SCALE", which specifies a viewing rate (speed), in an RTSP header. An appropriate scene can be retrieved using these commands. For instance, the client terminal 100 retrieves the start-time as well as the end-time of the requested scene from the media server 101 and then transmits a request containing the time range of the desired material in the "RANGE" header so that the client terminal 100 can retrieve the appropriate scene. Further, the client terminal 100 is capable of increasing the viewing rate using "SCALE" while viewing the media, and of returning to a normal viewing rate as soon as the appropriate scene has been viewed.

FIG. 3 shows an example of messages exchanged to view the media 102 which resides in the media server 101, using RTSP. It is to be noted that in FIG. 3, "C" stands for the client terminal 100, "S" stands for the media server 101, and for instance, "C→S" means a message transmitted from the client terminal 100 to the media server 101.

As shown in FIG. 3, a time range can be specified by adding a "RANGE" option in the URI of the media that is to be controlled by the client terminal 100. In FIG. 3, a sequence number of the message (CSeq) and a unique number of the session (Session) are described in order to clarify the uniqueness of a requested message. In the case shown in FIG. 3, the client terminal 100 requests to deliver the media starting from a 1,800-second scene. The media server 101 prepares to deliver the media starting from the 1,800-second scene according to the request, transmits an "OK" message to the client terminal 100 and then delivers the media using RTP. The client terminal 100 transmits RTCP for confirmation to the media server 101 as soon as it has received the media. Here, it is to be noted that the client terminal 100 has to know the time range for an appropriate scene in advance so as to request the appropriate scene from the media server 101.

In addition, an information delivery service which delivers various contents has become available in recent years. This information delivery service can provide a convenient service because it can be utilized as an advertising media, and a user can retrieve only appropriate information. In this regard, data describing the access privileges of a user is added to contents which are provided by a service provider, so as to control user access to the delivered information. In the conventional art, XAS (XML Access Sheet) which describes user the access privileges for a document structured by XML, i.e., XHTML, according to an XML format is made in a server, and the access privileges are determined by the service provider. In such an environment, it has been proposed that a document, according to the access privileges of a user, is automatically generated using XAS. Specifically, "Subject" specifying "to which user", "Object" specifying "which information" and "Sign" specifying the access privileges to the "Object" are described in the XAS. In the "Subject", not only a user account name, but also a source IP address, a group which the user belongs and its role can be described, which allows access control of the user from various points of view by assigning the user to "Subject".

FIG. 4 shows a block diagram illustrating a method of generating a document from XHTML: the access privileges are reflected and the document is generated based on XAS.

As shown in FIG. 4, there is an XHTML 1600 in which access control is to be applied, and a DTD 1601 which is a definition document of the XHTML 1600. Further, an XAS 1602 and an XAS 1603 are linked to the XHTML 1600 and DTD 1601, respectively. In order to apply access control to the XHTML 1600, the following processes are set: a parsing 1604 which parses the XHTML 1600 to a Document Object Model (DOM) tree; a labeling 1605 which labels each object of the DOM tree according to a "Sign" of XAS; a DOM transforming 1606 which transforms the DOM tree using only the elements labeled as "permit", and an unparsing 1607 which unparses the DOM tree to XHTML. The parsing 1604 is first applied to the XHTML 1600 and it is parsed to a DOM tree. The labeling 1605 is then applied to the DOM tree so as to label each object based on the XAS 1602 and the XAS 1603. The DOM transforming 1606 is applied to the labeled DOM tree and it is transformed to a DOM tree configured by only the objects labeled as "permit". The unparsing 1607 is then applied to the transformed DOM tree and unparsed to XHTML.

Further, the client terminal needs to refer to a DTD generated by objects, to which only the transformed XHTML refers, in order for a system to be transparent to the client terminal. A process of loosening 1608 is therefore set to match the DTD 1601 with the transformed XHTML. The loosening 1608 is applied to the DTD 1601 and it becomes a loose DTD. The method heretofore described, transformed XHTML 1609 and a loose DTD 1610, in which the access privileges of a user are reflected based on XAS, are automatically generated.

In the method of the conventional art described above, a requested scene can be retrieved by using the start-time and the end-time of the desired scene and by transmitting a request describing a time range in the "RANGE" header. Besides, the client terminal can increase the viewing rate using "SCALE" while viewing a media and can return to a normal viewing rate as soon as the appropriate scene is viewed.

However, in a communication network which allows a relatively longer delay, e.g., a mobile communication network, it takes a longer time at a client terminal from the transmission of an RTSP command, until the controlling of a delivered media becomes possible. It therefore takes a longer time to retrieve an appropriate scene using an RTSP command, and it is difficult to apply this method to the communication network at this point in time.

Moreover, it is expected that the access control method for XHTML will be applied to a dynamic content in terms of time, e.g., continuous media such as audio and video. In other words, the dynamic content has a large presentation description when compared with static content, e.g., a document and therefore, specifying a start-time is required to deliver the dynamic content. Since it is impossible to control each piece of information contained in the dynamic content, applying the access control method for XHTML to the dynamic content is not practical.

BRIEF SUMMARY OF THE INVENTION

The present invention has been made in view of the above problems, and thus has the object of providing an information delivery system, an information delivery method, an information delivery server, a content delivery server and a client terminal, which are capable of jumping to an appropriate scene by transmitting a single request to control media delivered from a client terminal to an information delivery server during the playback of media data, and delivering information smoothly without a delay that interrupts the controlling of the delivered media. Further, the present invention has also an object of providing the above, which are capable of automatically generating a digest of dynamic content in terms of time, according to the access privileges of a user defined by the server and delivering information accurately based on attributes of the user.

To achieve the object, it is preferred that in the present invention, when delivering media data such as audio and video to a client terminal, the media data is stored in a media storing unit and sequence information for specifying an address at the beginning of the media data is stored in a sequence information storing unit, a media control request which requests delivery of the media data is generated at the client terminal and a scene identifier which specifies an elapsed time as well as the current scene being viewed is added to the generated media control request, the media control request is received at a information delivery server to verify the sequence information based on the received media control request and retrieving media data from the media storing unit starting from a prescribed point according to the result of the verification of the sequence information, and a retrieved media data is delivered to the client terminal.

In the present invention, it is preferred that meta-information which links text data describing a digest of each scene to an address of the scene is included in the sequence information, a scene keyword which specifies a requested scene to view is included in the media control request, and the text data based on the received scene keyword is detected and the media data based on the address linked to the detected text data is retrieved.

According to the present invention, the client terminal transmits a scene identifier (i.e., "JUMP" command), which allows jumping to an appropriate scene by expanding RTSP, to the information delivery server, and rapidly receives the appropriate scene which a user has requested.

In other words, the "JUMP" command, as its arguments, has a "Playtime" which means the current elapsed time of the delivered media at the client terminal, and a "Scene" which allows jumping to the scene that the user requests. The information delivery server acquires scene synchronization with the client terminal based on the "Playtime" as the "JUMP" message is received. Since the information delivery server then starts control of a media stream from the specified scene after the scene specified by the "JUMP" command is searched and the "Response" message is transmitted, it is feasible to start delivering the media from the requested scene smoothly without a delay.

Further, "JUMP" can be utilized like a command included in the header of RTSP, e.g., "RANGE" and "SCALE" and may be an optional command like "PLAY" and "RECORD".

For instance, according to the present invention, an appropriate scene can be retrieved without knowledge of the start-time of the scene at the client terminal. Further, the appropriate scene can be retrieved by transmitting the "JUMP" command without transmitting messages to the server, e.g., a request for transmitting the start-time of the scene, of changing a viewing rate. Therefore, the load on a network can be reduced, and the information delivery system can accommodate a network that has a high latency and jitter, e.g., a mobile communication network.

It is also preferred that in the present invention, when delivering media data such as audio and video to a client terminal, the media data is stored in a media storing unit, meta-information which links text data describing a digest of each scene of the media data to an address of the scene is stored in a meta-information storing unit and a user identifier of a user with linking to the access privileges of the user is stored in a user database, a media control request, which requests delivery of the media data is generated at the client terminal and the user identifier is added to the generated media control request, the media control request is received at an information delivery server and the access privileges of the user are implemented based on a search of the user database according to the received media control request, the meta-information is verified based on the implemented access privileges and media data is retrieved starting from a prescribed point according to the result of the verification of the meta-information, and a retrieved media data is delivered to the client terminal.

In the present invention described above, it is preferred that information which specifies an allowable time range that the user can view and an order of viewing for each scene is included in the access privileges, and the media data is retrieved based on the information.

In the present invention described above, it is preferred that the information which specifies an allowable time range that the user can view and an order of viewing for each scene is delivered to a client terminal of the user as a presentation description data.

According to these inventions, it is feasible to perform the access control of each user by reconfiguring meta-information of media data based on the access privileges of the user. Further, it is feasible to configure a policy describing the access privileges, in which a notion regarding an allowable time range that the user can view, and an order of viewing, are incorporated, so as to provide a service for delivering the presentation description data based on the access privileges.

For instance, the present invention allows the delivery of a digest of scenes according to the access privileges of the user, in which the notion regarding the allowable time range and the order of viewing for AV media specified by a service provider are incorporated. Thus, a brand-new information delivery service that delivers mandatorily viewed content, e.g., an advertisement, can be provided.

Further, since a signature and a valid time period can be added to a media control request using the presentation description data when requesting delivery of media data for instance, illegal access to the server can be avoided.

BRIEF DESCRIPTION OF THE SEVERAL VIEWS OF THE DRAWINGS

FIG. 5 is a sequence chart regarding an information delivery system according to the first embodiment;

FIG. 6 is an example of a "JUMP" message according to the first embodiment;

FIG. 7 is an example of messages used for searching an appropriate scene by "JUMP" command according to the first embodiment;

FIG. 8 is an example of an error message in a case where scene synchronization with the client terminal 1000 failed at the content delivery server 1001 according to the first embodiment;

FIG. 9 is an example of an error message in a case where the scene specified by the client terminal 1000 has already been transmitted as the result of searching by the content delivery server 1001 according to the first embodiment;

FIG. 10 is an example of an error message in a case where the scene specified by the client terminal 1000 cannot be searched at the content delivery server 1001 according to the first embodiment;

FIG. 16 is a configuration regarding the information delivery system according to the second embodiment;

FIG. 17 is a sequence chart regarding the information delivery system according to the second embodiment;

FIG. 22 is an example of the XAS utilized in the second embodiment;

FIG. 23 is an example of meta-information of MPEG-7 before access control is applied in the second embodiment;

FIG. 24 is an example of SMIL that is generated in the PDD generator 1503 based on the meta-information of MPEG-7 before access control is applied in the second embodiment;

FIG. 25 is an example of meta-information of MPEG-7 after access control is applied in the second embodiment;

FIG. 26 is an example of SMIL that is generated in the PDD generator 1503 based on the meta-information of MPEG-7 after access control is applied in the second embodiment;

FIG. 27 is a sequence chart showing a method to share the presentation description data between a client terminal and the content delivery server in the second embodiment;

DETAILED DESCRIPTION OF THE INVENTION

First Embodiment (Overview of Operation)

Figure 1:
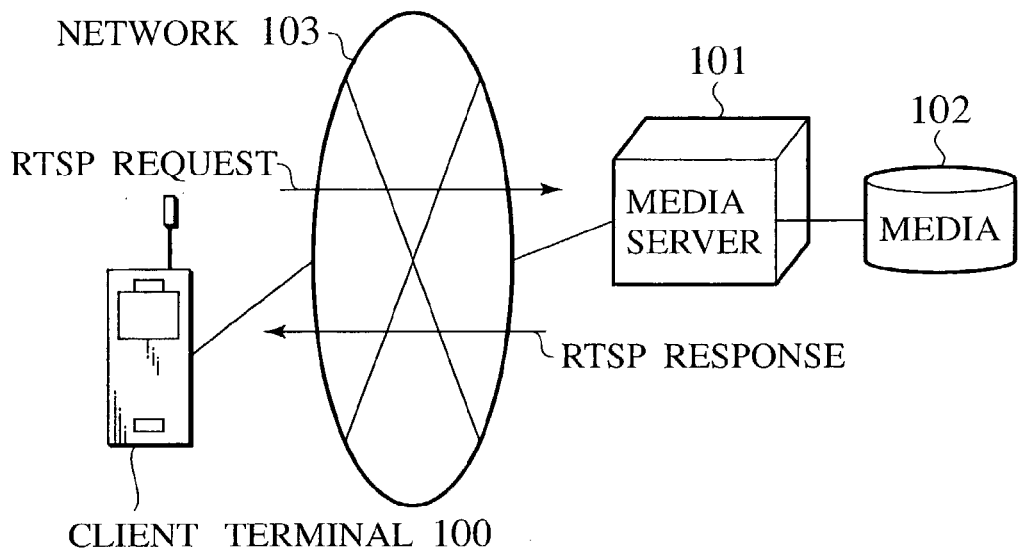
FIG. 1 is a schematic diagram describing a method of controlling a media stream which resides in a server using an RTSP in the conventional art.
Figure 2:
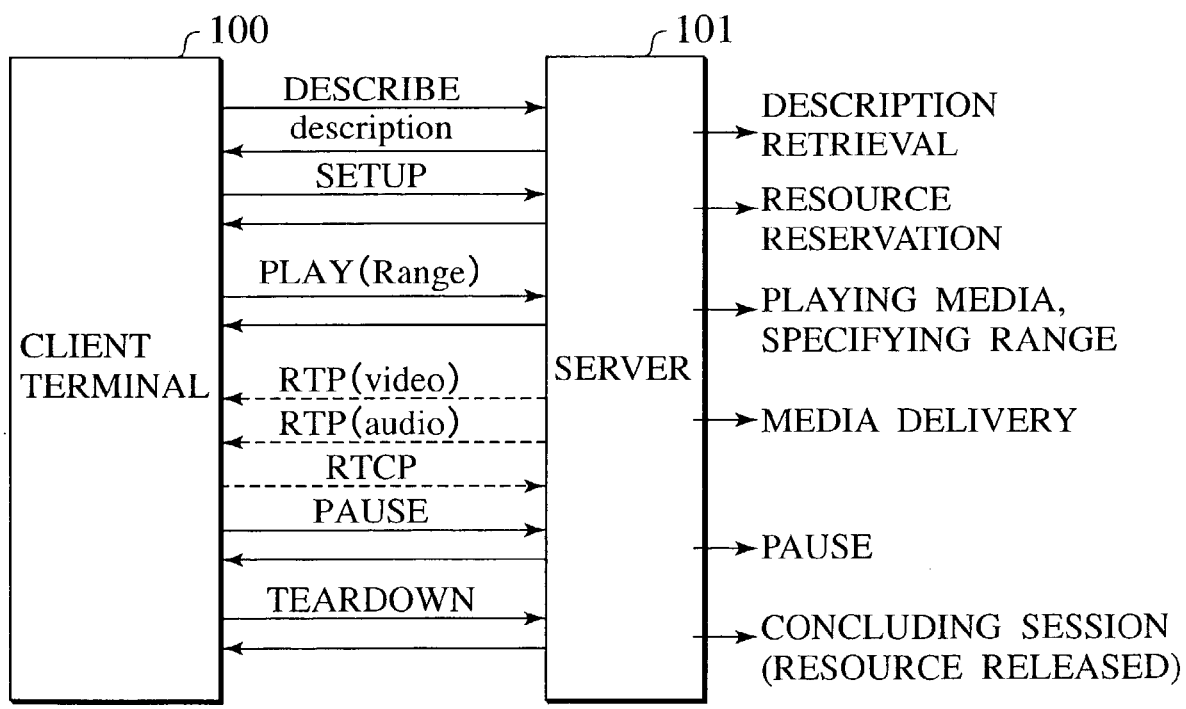
FIG. 2 is a sequence chart describing a method of controlling a media stream which resides in a server remotely using an RTSP in the conventional art.
Figure 3:
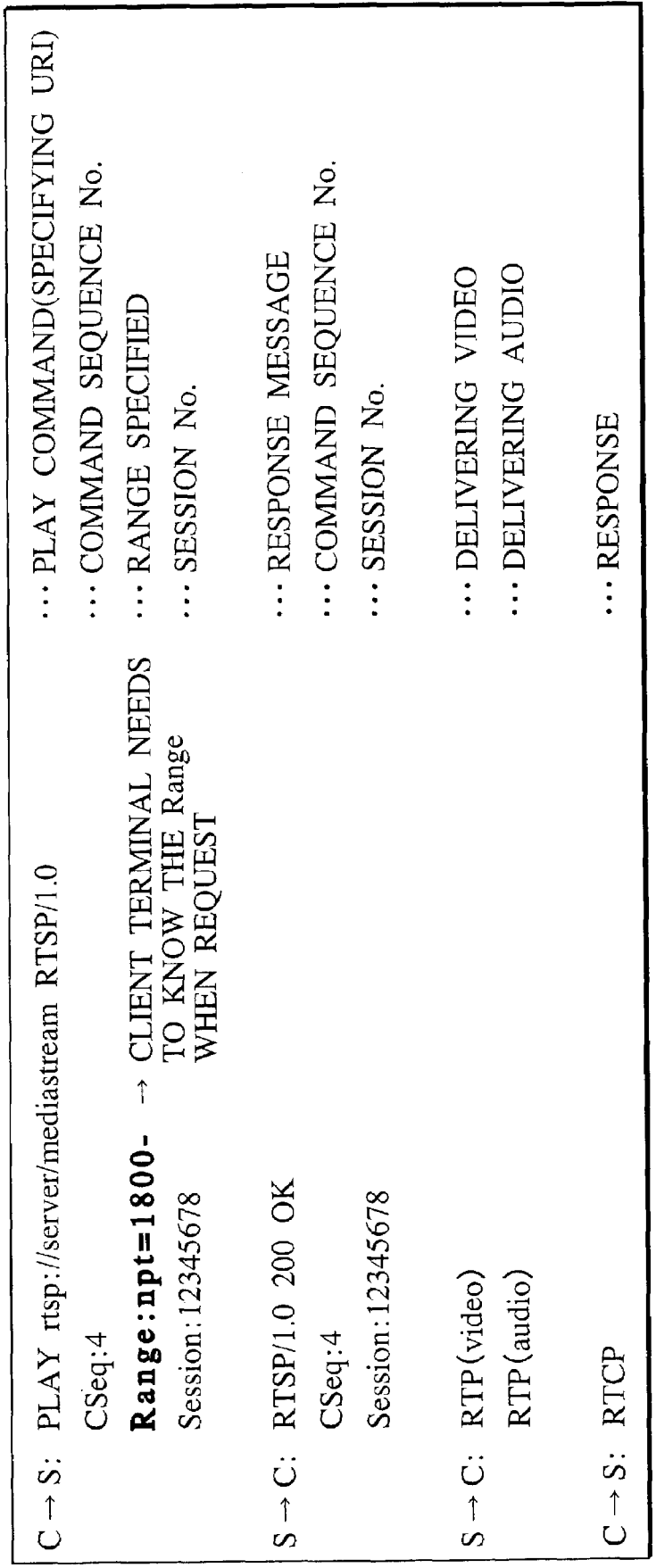
FIG. 3 is a schematic diagram showing messages exchanged in a case where a media 102 which resides in a media server 101 is viewed using an RTSP in the conventional art.
Figure 4:
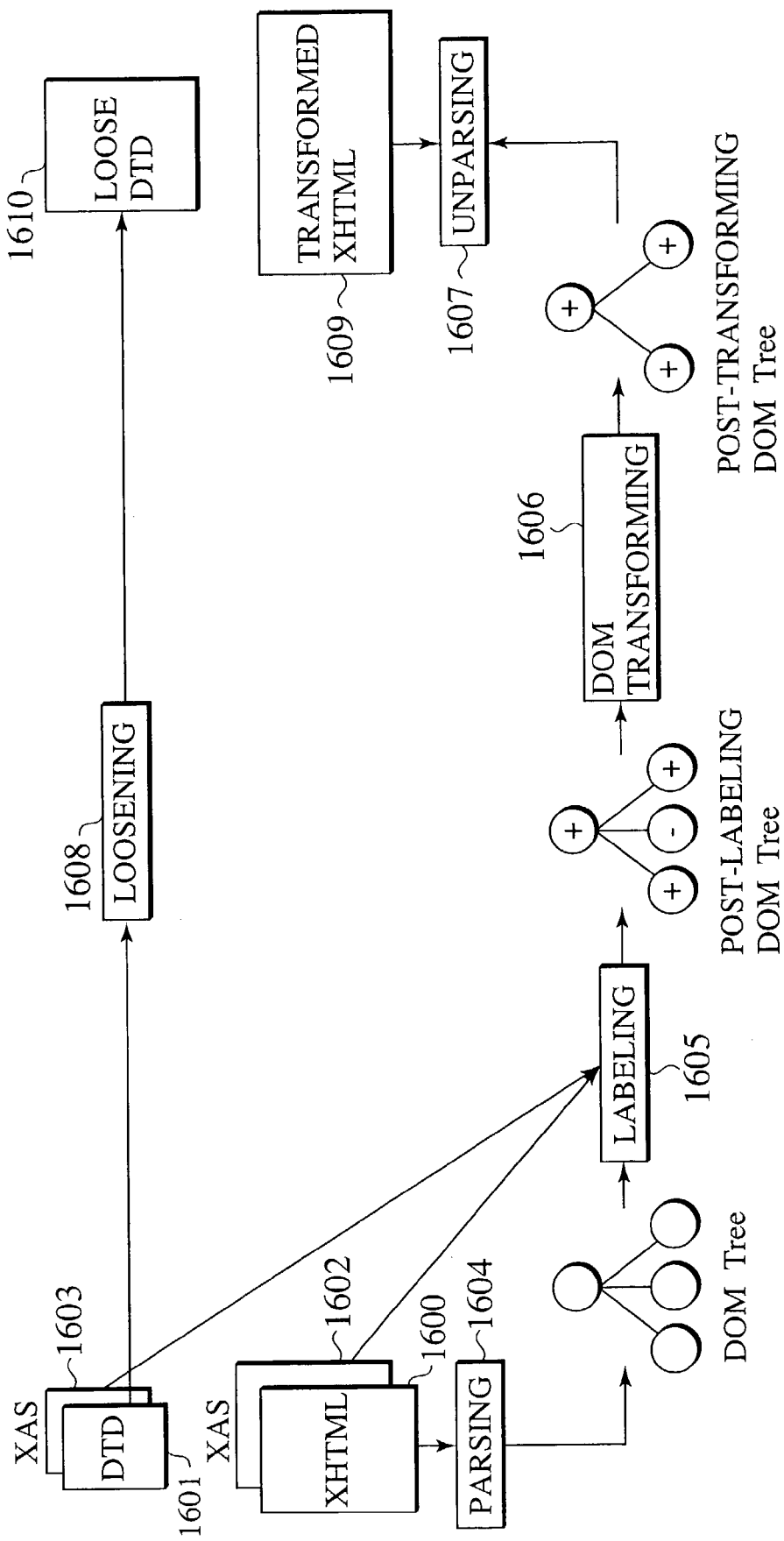
FIG. 4 is a schematic diagram illustrating a method of generating a document in which the access privileges are reflected based on XHTML and XAS in the conventional art.

A first embodiment of the present invention is described with reference to the associated drawings. FIG. 5 is a sequence chart showing a process regarding an information delivery system of the invention.

As shown in FIG. 5, the information delivery system comprises a client terminal 1000 which transmits a media control request including a "JUMP" command when requesting delivery of information, and a content delivery server 1001 which controls media using a database according to the request. Incidentally, since the "JUMP" command is one of commands in an RTSP header field, the client terminal 1000 can request the "JUMP" command remotely in line with processes defined by the specification of RTSP, e.g., retrieval of description, resource reservation, controlling of media, delivery of media and conclusion of a session.

More specifically, as shown in FIG. 5, in the information delivery system, the client terminal 1000 remotely controls a media stream which resides in the content delivery server 1001 using RTSP.

The client terminal 1000 first transmits a "DESCRIBE" message to the content delivery server 1001 and requests the retrieval of a description of a media stream in order to control media using RTSP. The content delivery server 1001 transmits the description of an appropriate media stream to the client terminal 1000 according to the request. The client terminal 1000 then transmits a "SETUP" message to the content delivery server 1001, which ensures reservation of resources.

The content delivery server 1001 reserves resources and transmits a response message to the client terminal 1000 according to the request. The client terminal 1000, as soon as the response is received, recognizes that controlling of media has become possible, and adds a "JUMP" command to a "PLAY" command (that is an actual controlling command) and transmits the "PLAY" command to the content delivery server 1001.

The content delivery server 1001 prepares to control the media according to the command received and then transmits a response message for the command. The content delivery server 1001 controls the requested media, and finally the client terminal 1000 transmits a "TEARDOWN" message to the content delivery server 1001 so as to conclude the session.

FIG. 6 shows an example of a "JUMP" message described above. As shown in FIG. 6, the "JUMP" message is configured by a "Playtime" which means the elapsed time of the viewing media, and a "Scene" which specifies an appropriate scene. The content delivery server 1001 performs scene synchronization easily according to the "Playtime" transmitted by the client terminal 1000. Further, "Scene" has a relative time distance "dif", which indicates a time from the scene currently being viewed, which is set at "0". The value of "dif" is described as an argument of the "Scene" and an appropriate scene can therefore be specified.

FIG. 7 shows an example of messages used for searching an appropriate scene by "JUMP" command. In FIG. 7, "C" stands for the client terminal 1000, "S" stands for the content delivery server 1001, and for instance, "C→S" means a message transmitted from the client terminal 1000 to the content delivery server 1001.

As shown in FIG. 7, a "JUMP" message is described in a header of a "PLAY" command as a message transmitted from the client terminal 1000 to the content delivery server 1001. The client terminal 1000 captures the elapsed time and describes the time as the "Playtime" so as to request the "JUMP" command. In the example shown in FIG. 7, although "Normal Play Time" (NPT) is utilized, "SMPTE Timestamp Absolute Time", which is defined by the specification of RTSP can also be utilized, taking into account the easiness of capturing the elapsed time and detecting a scene.

Next, the client terminal 1000 describes the relative time distance from the scene currently being viewed to an appropriate scene in the "dif" of the "Scene". The content delivery server 1001 searches the scene based on the "Playtime" and "Scene" transmitted by the "JUMP" message and transmits a "Download confirmation" message to the client terminal 1000. In the "Download confirmation" message, a downloaded-start-time which indicates an elapsed time from the beginning of the media to be delivered is described, and therefore the elapsed time from the beginning of the media to be delivered can be confirmed.

FIGS. 8, 9 and 10 show examples of error messages regarding the "Download confirmation" message.

FIG. 8 shows an example of an error message to be transmitted in a case where scene synchronization with the client terminal 1000 failed at the content delivery server 1001. As shown in FIG. 8, "Synchronize Error" which means a failure of synchronization and the "Playtime" specified by the client terminal 1000 are described in the response message.

FIG. 9 shows an example of an error message to be transmitted in a case where it is recognized that the scene specified by the client terminal 1000 has already been transmitted as the result of searching by the content delivery server 1001. As shown in FIG. 9, a start-time of the scene, which is retrieved as the result of searching, and "Send already", which means the scene has already been transmitted, are described.

FIG. 10 shows an example of an error message to be transmitted in a case where the scene specified by the client terminal 1000 cannot be searched at the content delivery server 1001. As shown in FIG. 10, the "Playtime" as well as the "Scene" specified by the client terminal 1000 and "Search Error", which means failure of searching, are described.

(Configuration)

Figure 11:
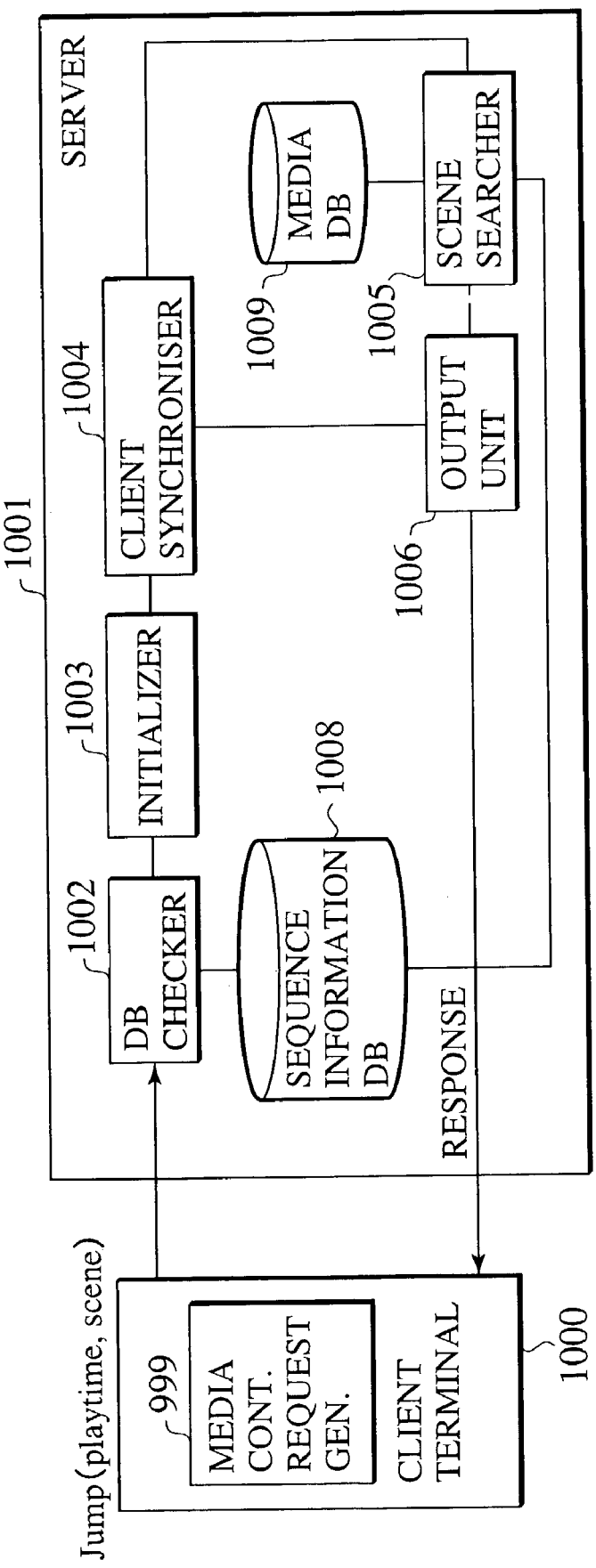
FIG. 11 is a block diagram describing internal configuration of the information delivery system in detail according to the first embodiment.

Hereafter, the information delivery system, which has the function of a "JUMP" process, will be described. FIG. 11 shows a block diagram describing the internal configuration of the information delivery system according to this embodiment.

As shown in FIG. 11, the information delivery system according to this embodiment comprises the client terminal 1000 which acts as a buyer of content, and the content delivery server 1001. They are interconnected via a network as described above.

The role of the content delivery server 1001 is to deliver media data, e.g., audio and video, to the client terminal 1000.

The content delivery server 1001 is configured with a media database 1009 (a media storing unit) which stores media data, a sequence information database 1008 (a sequence information storing unit) which stores sequence information for specifying the address of media data to deliver, a scene searcher 1005 which verifies the sequence information according to a request of the controlling media received from client terminal 1000 and retrieves appropriate media data from the media database 1009 starting from a prescribed point based on a result of the verification, and an output unit 1006 which delivers the retrieved media data to the client terminal 1000.

The client terminal 1000 has a media control request generator 999 which generates a media control request for requesting delivery of media data and adds an identifier (a scene identifier) to specify the elapsed time as well as the scene being viewed to the generated media control request.

More specifically, there are a database checker 1002, an initializer 1003 and a client synchronizer 1004 in the content delivery server 1001. The sequence information database 1008 is connected to the database checker 1002 and the scene searcher 1005, respectively.

The database checker 1002 receives a "JUMP" command from the client terminal 1000 to interpret an RTSP command included in the "JUMP" command and searches the sequence information database 1008 based on a result of the interpretation so that sequence information, e.g., a URI, corresponding to the requested media can be retrieved. The database checker 1002 forwards the sequence information that is a result of the searching and the "JUMP" command to the initializer 1003.

The initializer 1003 receives the "JUMP" command from the database checker 1002. The initializer 1003 then extracts the "Playtime" and "Scene", which are arguments of the "JUMP" command, initializes variables used for the "JUMP" process and forwards the extracted "Playtime" and "Scene" to the client synchronizer 1004 together with the sequence information.

The client synchronizer 1004 recognizes the scene currently being viewed at the client terminal 1000 based on the sequence information searched by the database checker 1002 and the "Playtime" extracted by the initializer 1003. The client synchronizer 1004 then performs scene synchronization. The scene synchronization will be described later.

The scene searcher 1005 compares the sequence information searched by the database checker 1002, and the scene extracted by the initializer 1003 so as to search the scene specified by the client terminal 1000.

The output unit 1006 determines a response message and prepares to control the contents according to the output from the client synchronizer 1004 and the scene searcher 1005. The output unit 1006 then transmits the response message to the client terminal 1000. Incidentally, in this embodiment, the database checker 1002, the initializer 1003, the client synchronizer 1004 and the scene searcher 1005 mean a retriever, and the output unit 1006 means a deliverer.

In the sequence information database 1008, media managed by the content delivery server 1001 is linked to the sequence information (e.g., a URI, a scene number) and the elapsed time of each scene from the beginning and the total-time of the scene, are stored.

The elements of the sequence information stored in the sequence information database 1008 which are described above need to be processed independently: these elements can be described using a relational database or can be described as meta data of MPEG-7, etc. The scene number is an element to ease the searching of scenes by numbering each scene specified by the "JUMP" command. The elapsed time of each scene and the total-time of the scene are elements required for the scene synchronization with the client terminal 1000.

(Process Regarding the Information Delivery System)

Hereafter, a process regarding the information delivery system of this embodiment will be described.

(1) Synchronization

Figure 12:
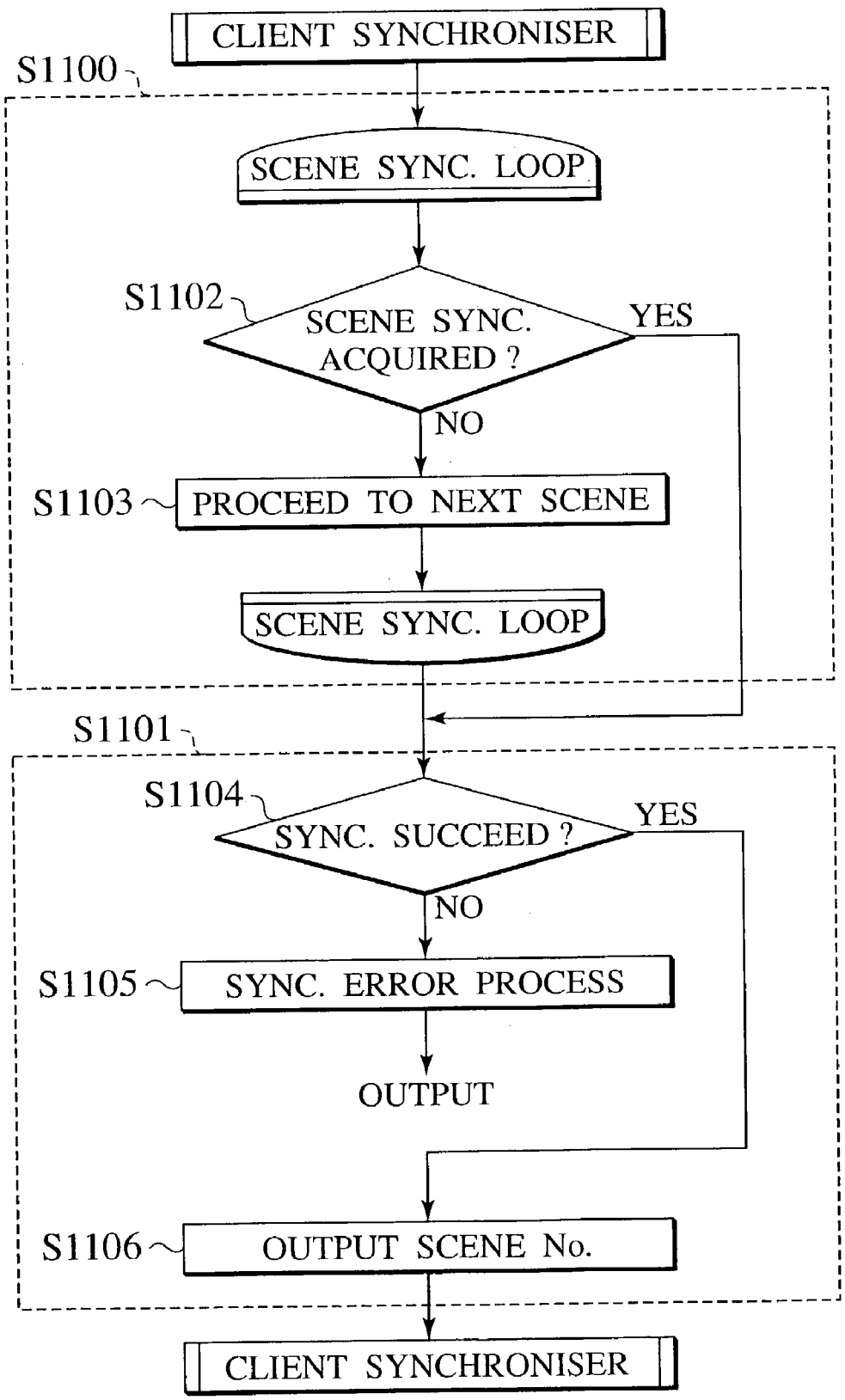
FIG. 12 is a flowchart showing a process of the client synchronizer 1004 according to the first embodiment.

FIG. 12 is a flowchart showing a process of the client synchronizer 1004.

The client synchronizer 1004 recognizes the scene currently being viewed at the client terminal 1000 so as to perform scene synchronization. As shown in FIG. 12, the client synchronizer 1004 is configured with a scene sync. loop step S1100 and a sync. check step S1101. The scene sync. loop step S1100 has a scene sync. verification step S1102, and a scene forward step S1103 which shifts to the next scene. The sync. check step S1101 has a sync. verification step S1104, a sync. error processing step S1105 and a scene number output step S1106.

The scene sync. loop step S1100 has a loop configured by the scene sync. verification step S1102 and scene forward step S1103. In the scene sync. loop step S1100, firstly the "Playtime", which indicates the elapsed time, is received from the client terminal 1000. At the scene sync. verification step S1102, each scene number stored in the content delivery server 1001 and the sequence information in which the start-time and the total-time are searched, the "Playtime" and the sequence information are compared. The scene sync. verification step S1102 and the scene forward step S1103 are repeatedly performed until the scene synchronization is acquired. Accordingly, since the "Playtime", which indicates the elapsed time, is transmitted by the client terminal 1000, the content delivery server 1001 can easily synchronize with the scene being viewed at the client terminal 1000, which RTSP cannot achieve.

At the sync. verification step S1104 in the sync. check step S1101, whether to transmit an error message or proceed to the next step is determined. In other words, at the sync. verification step S1104, whether the "Playtime" specified by the client terminal 1000 exists or not in the sequence information (URI) is verified. As a result, if the synchronization is successful, the synchronized scene is outputted at the output unit 1006. On the other hand, if the synchronization fails, the error message shown in FIG. 8 is transmitted to the client terminal 1000.

Next, the appropriate scene specified by the client terminal 1000 is searched for by the scene searcher 1005.

(2) Scene Search

Figure 13:
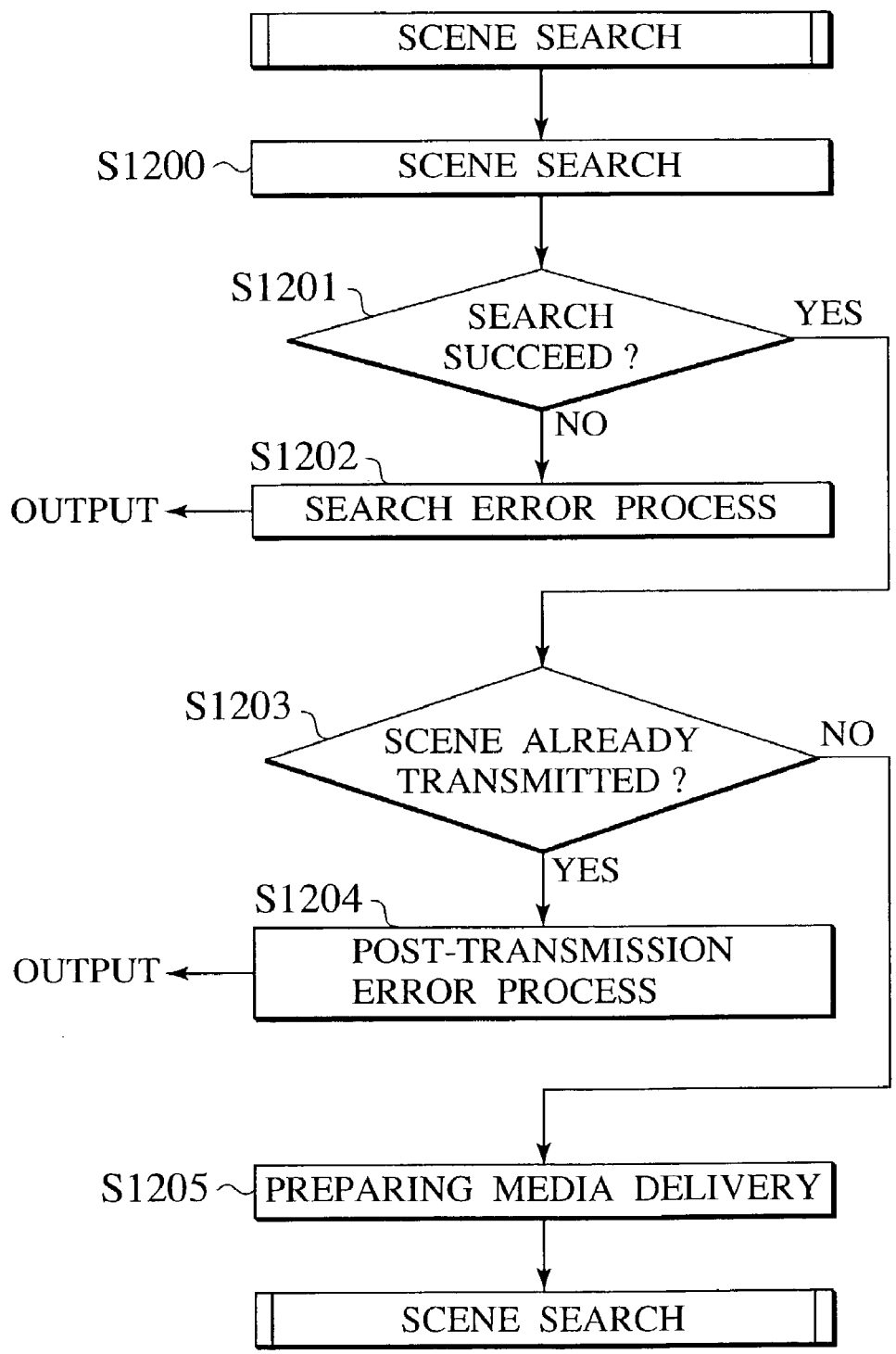
FIG. 13 is a flowchart showing a process of the scene searcher 1005 according to the first embodiment.

FIG. 13 is a flowchart showing a process of the scene searcher 1005.

As shown in FIG. 13, the process of scene search is configured with steps S1200 through S1205.

At the scene search step S1200, the scene specified by the client terminal 1000 is searched and the start-time of the scene according to the sequence information is outputted. In other words, the search process is performed in the sequence information using the scene number of the current synchronized scene and the "dif", which is an argument of the "JUMP" command, and which is an attribute of "Scene". Since the "dif" indicates a relative time distance from the current scene, which is set at "0", for instance, a point to be searched in the sequence information can be identified by the sum of the current scene number and the value of the "dif".

At a search verification step S1201, whether the specified scene is searched for or not is determined, based on the result of the scene search step S1200. If the search succeeds, the start-time of the scene is acquired from the sequence information and the process is shifted to a transmission check step S1203. If the search fails, the process is shifted to a search error process step S1202 and the error message shown in FIG. 10 is transmitted to the client terminal 1000.

At the transmission check step S1203, whether or not the acquired scene according to the result of the scene search has already been transmitted to the client terminal 1000 is determined. If the acquired scene has not yet been transmitted to the client terminal 1000, the process is shifted to a media transfer preparation step S1205 so as to prepare for the controlling of the media. If the acquired scene has already been transmitted to the client terminal 1000, the process is shifted to a post-transmission error process step S1204 and the error message shown in FIG. 9 is transmitted to the client terminal 1000.

(Modification)

The present invention is not limited to the first embodiment described above and the following modification can be achieved.

For instance, text data which describes a digest of each scene of the media data, and meta-information linked to the address of each scene can be added to the sequence information. In this case, the client terminal 1000 may add a scene keyword, which specifies an appropriate scene to view, to the request for controlling media. The scene searcher 1005 may search the aforementioned text data according to the received scene keyword, and may retrieve media data based on the address linked to the searched text data.

Specifically, the client terminal 1000 specifies an appropriate scene using a "Keyword", and the content delivery server 1001 is expandable, to facilitate searching by the "Keyword". In order to realize the modification, the scene keyword indicating a digest of the scene would be described as an element of the sequence information.

Figure 14:
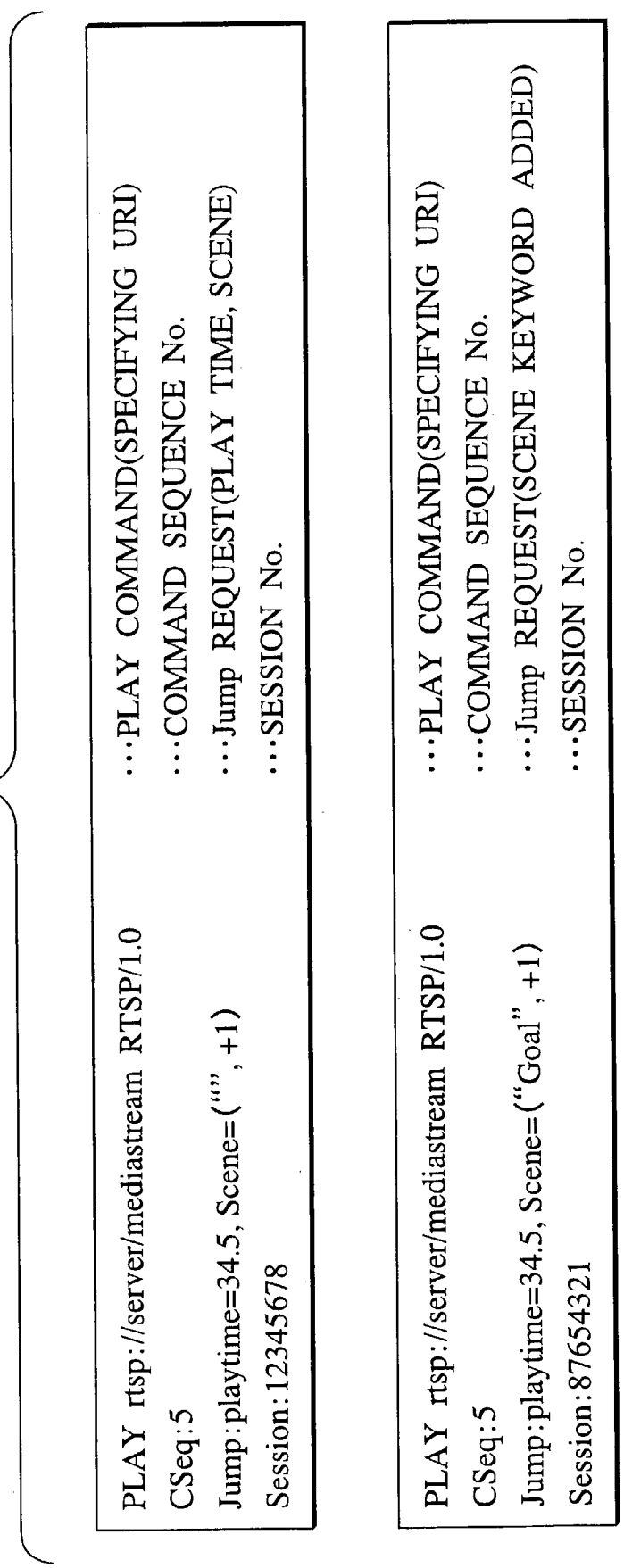
FIG. 14 is an example of a "JUMP" message in which a notion of "Keyword" is reflected according to a modification of the first embodiment.

FIG. 14 shows an example of a "JUMP" message in which the notion of the "Keyword" is reflected. As shown in FIG. 14, an attribute for the "Keyword" is added to the "Scene" so as to specify an appropriate scene by the "Keyword". The "JUMP" message makes the content delivery server 1001 search for the scene according to the value of "dif" within the scenes which matches the "Keyword". Further, if the "Keyword" attribute in the "Scene" is null, it is equivalent to the above described process, such as using the "dif" only.

Figure 15:
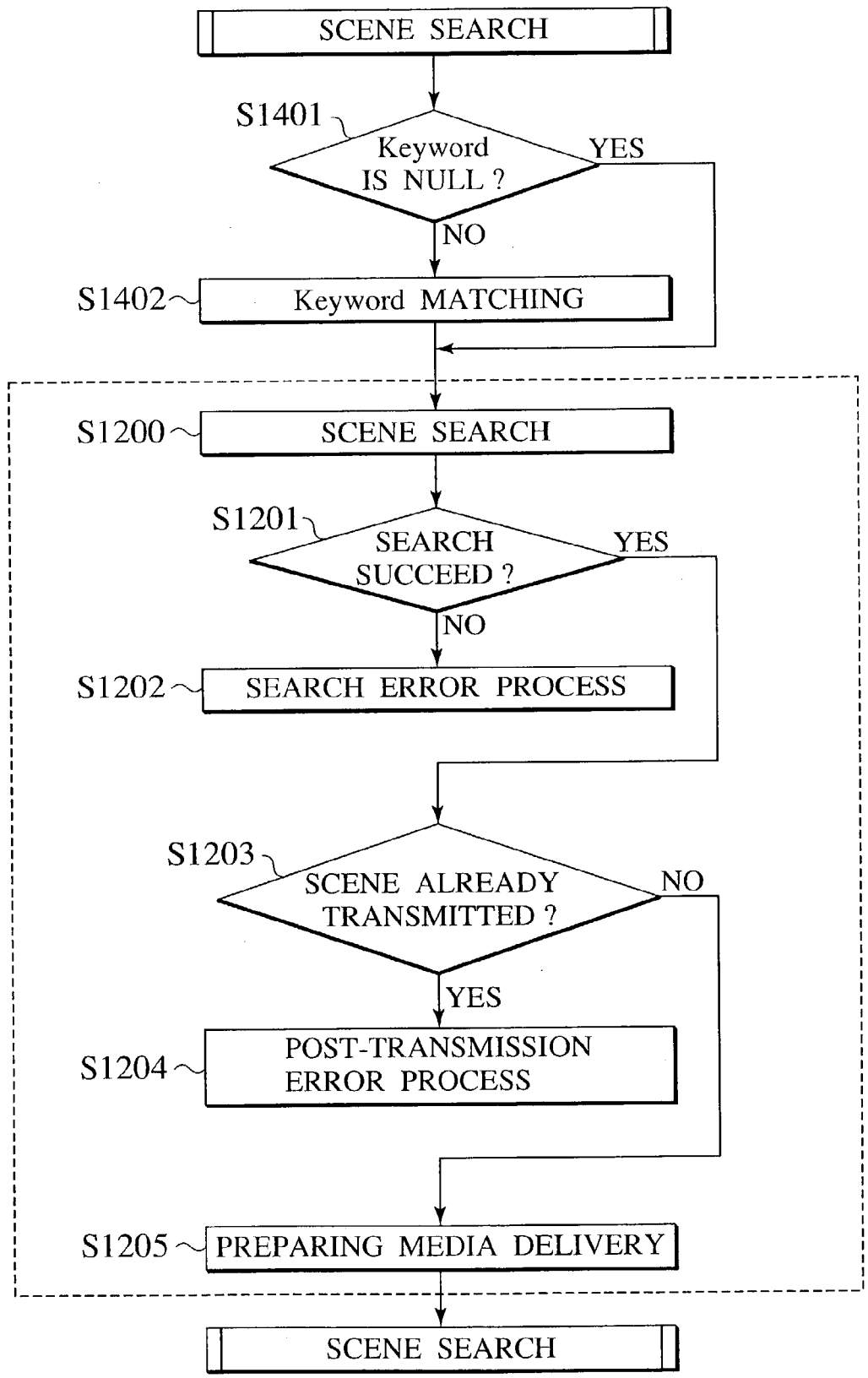
FIG. 15 is a flowchart showing a process of the scene searcher 1005, in which a notion of the "Keyword" is reflected according to a modification of the first embodiment.

FIG. 15 is a flowchart showing a process of the scene searcher 1005, in which the notion of the "Keyword" is reflected. As shown in FIG. 15, the process according to the modification is configured with a keyword check step S1401 and a keyword matching step S1402 in addition to the steps S1200 through S1205 shown in FIG. 13.

At the keyword check step S1401, the "Keyword" is extracted from the "JUMP" arguments and the value of the "Keyword" is checked. If the value is null, the process is not shifted to the keyword matching step S1402, and is instead shifted to the scene search step S1200. At the keyword matching step S1402, the value of the "Keyword" and the scene keyword of each scene are compared. As a result of the comparison, the sequence information is reconfigured in order to retrieve only the scenes which match the value of the "Keyword". Incidentally, in this embodiment, it is assumed that reconfiguration of the sequence information under a certain condition using only queries is relatively easy. For instance, it is assumed that the sequence information is described using a relational database or XML.

Second Embodiment

Hereafter, a second embodiment of the present invention will be described.

(Configuration)

Figure 18:
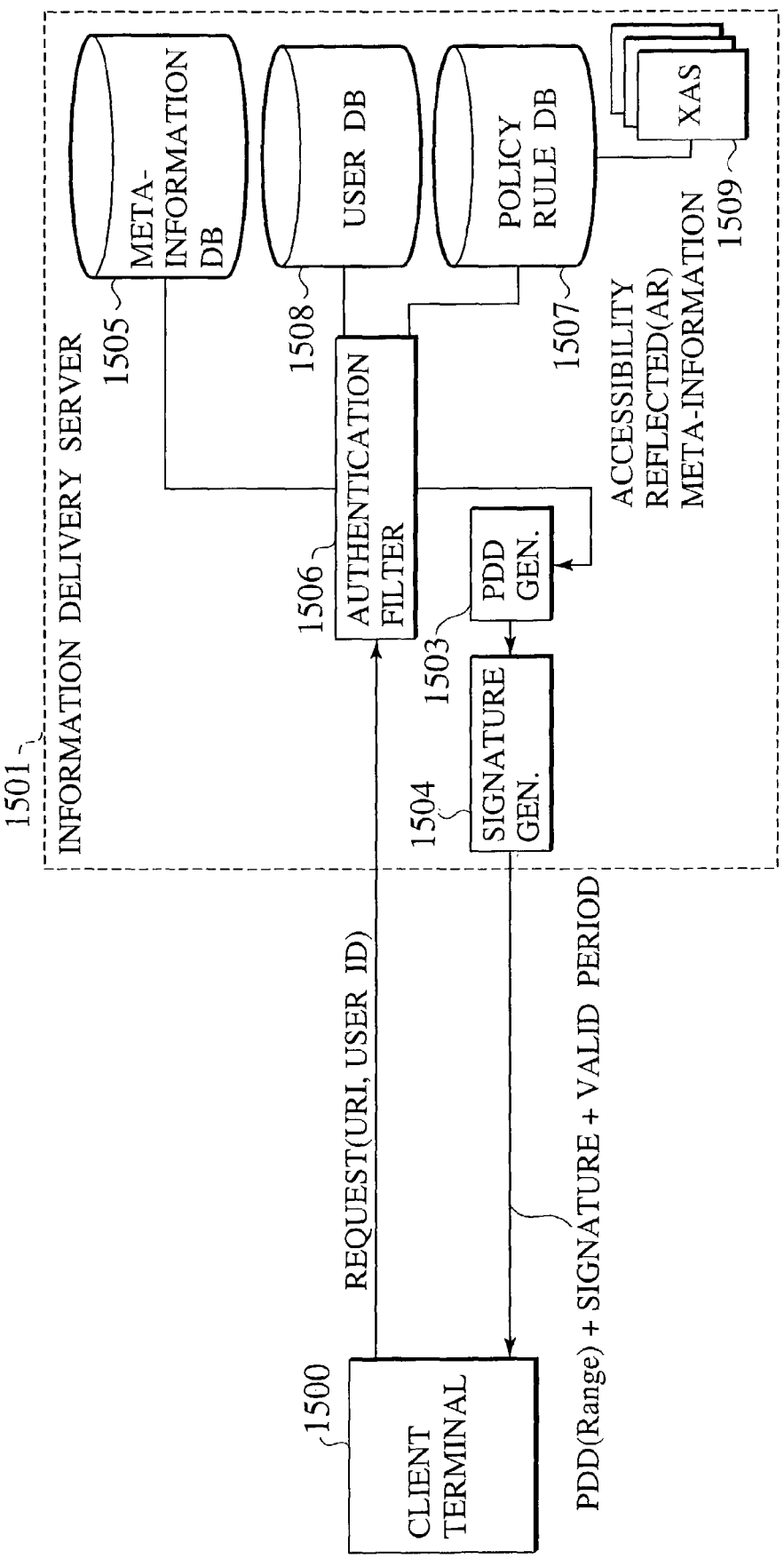
FIG. 18 is a configuration regarding the information delivery system according to the second embodiment.
Figure 20:
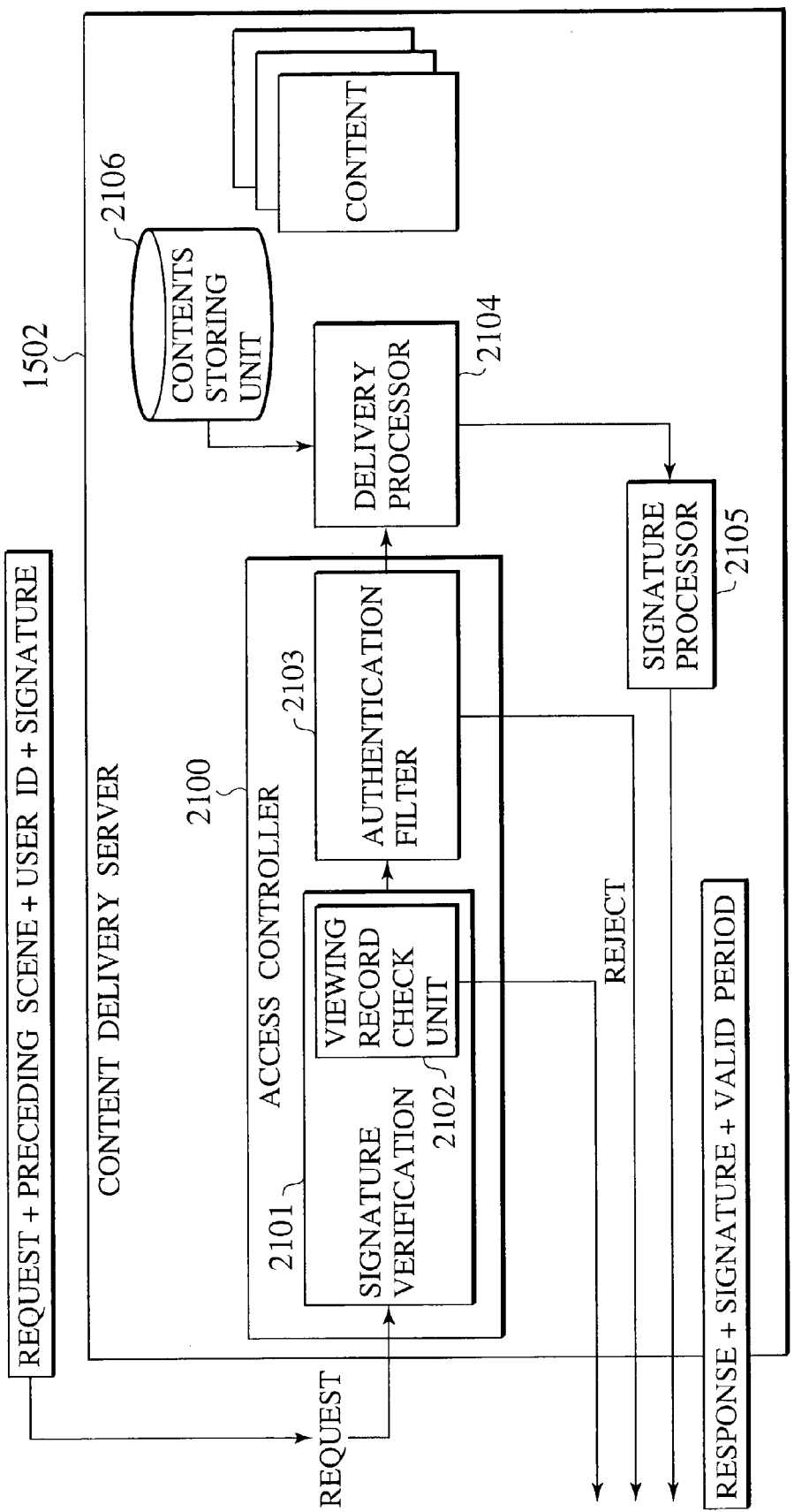
FIG. 20 is a configuration regarding the information delivery system according to the second embodiment.

In this embodiment, the information delivery system allows user access control by reconfiguring meta-information of contents (i.e., media data) according to the access privileges of the user. FIGS. 16, 18 and 20 show configuration regarding the information delivery system in this embodiment.

As shown in FIG. 16, the information delivery system according to this embodiment comprises a client terminal 1500, an information delivery server 1501 and a content delivery server 1502, which are interconnected via a network 103.

Specifically, as shown in FIG. 20, the role of the content delivery server 1502 is to deliver contents, e.g., audio and video, to the client terminal 1500. The content delivery server 1502 is configured with a contents storing unit 2106 (a media storing unit) which stores contents, and a delivery processor 2104 which compares meta-information based on the access privileges of a user, and retrieves contents starting from a prescribed point from the contents storing unit 2106 based on the result of a comparison. Further, the delivery processor 2104 transmits the retrieved contents to the client terminal 1500. Incidentally, in this embodiment, the delivery processor 2104 means a retriever and a deliverer.

As shown in FIG. 18, the information delivery server 1501 is configured with a meta-information database 1505 (a meta-information storing unit), a user database 1508 and an authorization filter 1506. The meta-information database 1505 stores text data describing a digest of each scene of the contents, and the meta-information linked to the address of each scene. The user database 1508 links the access privileges of each user to each user identifier and stores the identifiers. The authorization filter 1506 receives a media control request, searches the user database 1508 based on the received request and implements the access privileges of the user.

Further, the content delivery server 1502 reconfigures the meta-information based on the access privileges of users defined by the policy of a service provider and transmits presentation description data (hereinafter referred to as PDD) based on the meta-information. In other words, information containing an allowable time range that a user can view and the order of scenes viewed are included in the access privileges. The delivery processor 2104 transmits the information as presentation information to the client terminal 1500.

The client terminal 1500 has a media control request generator 999, which generates a media control request for requesting delivery of contents.

(Process Regarding the Information Delivery System)

FIG. 17 is a sequence chart showing a process regarding the information delivery system of this embodiment.

The client terminal 1500, i.e., a user, requests retrieval of the PDD of contents from the information delivery server 1501. The client terminal 1500 transmits a request including a user identifier to identify users, in addition to a URI of the requested content. The information delivery server 1501 generates the PDD according to the access privileges of the user and transmits the PDD to the client terminal 1500. User access control that incorporates the notion of the allowable time range for viewing content and an order of viewing is applied to the PDD, which is difficult to achieve by the notion of in a user access control of XHTML.

Further, the information delivery server 1501 transmits a signature to certify that user access control is implemented, as well as valid period of the signature to the client terminal 1500 together with the PDD. The client terminal 1500 then requests a retrieval of content from the content delivery server 1502 according to the PDD received from the information delivery server 1501. At this point in time, the client terminal 1500 transmits the user identifier as well as the signature, together with the request of the content.

The content delivery server 1502 transmits a content delivery response to the client terminal 1500 as soon as validity of the signature and the requested data are confirmed. A new signature based on the viewing record of the user and its valid period are added to the content delivery response. Following the transmission of the content delivery response, the content delivery server 1502 transmits the content. In a case where the client terminal 1500, i.e., the user, further requests a retrieval of content, the client terminal 1500 adds the ID of the most recently viewed scene (i.e., the most recently retrieved scene), the signature included in the previous content delivery response, and the user identifier.

The content delivery server 1502 observes the most recently retrieved scene of each request and certifies that the order of viewing is adhered to. The user identifier is utilized to recognize the status of the client terminal 1500 at the servers. The user identifier consists of user information, e.g., the IP address of the client terminal, a user account name and a password, and further environmental information, e.g., information regarding the hardware that configures the client terminal.

FIG. 18 shows a block diagram of the information delivery server, which generates the PDD according to the access privileges of the user and transmits a signature and its valid period together with the PDD to the user.

In FIG. 18, the client terminal 1500 and the information delivery server 1501 are shown. The information delivery server 1501 is configured with the authorization filter 1506, a PDD generator 1503 and a signature generator 1504. The authorization filter 1506 is connected to the meta-information database 1505, which stores meta-information of the contents which reside in the content delivery server 1502, and a policy rule database 1507 which stores an XAS 1509 showing the access policy defined by a service provider for each of the contents.

The information delivery server 1501 forwards the request from the client terminal 1500 to the authorization filter 1506 and retrieves the XAS 1509, which describes the access privileges associated with the specified URI in the request from the policy rule database 1507. The information delivery server 1501 checks accessibility to the content specified by the user according to the XAS 1509 and retrieves meta-information from the meta-information database 1505 based on the specified URI.

In the authorization filter 1506, the retrieved meta-information is converted to the "accessibility reflected meta-information" (hereinafter referred as to AR meta-information), in which the access privileges of the user are reflected based on the XAS 1509. Further, the user identifier contained in the request is utilized to assign the user to the "Subject", in which a similar notion of access controls of XHTML. The PDD generator 1503 then generates a PDD using the AR meta-information. It is to be noted that since the PDD is generated using the AR meta-information, the access privileges of the user are reflected to the PDD generated by the PDD generator 1503.

The generated PDD is then forwarded to the signature generator 1504, and a signature certifying that the access control is implemented at a legal entity and its valid period are added. The information delivery server 1501 may issue the signature or the other trusted entity may issue and transmit the signature to the user.

Figure 19:
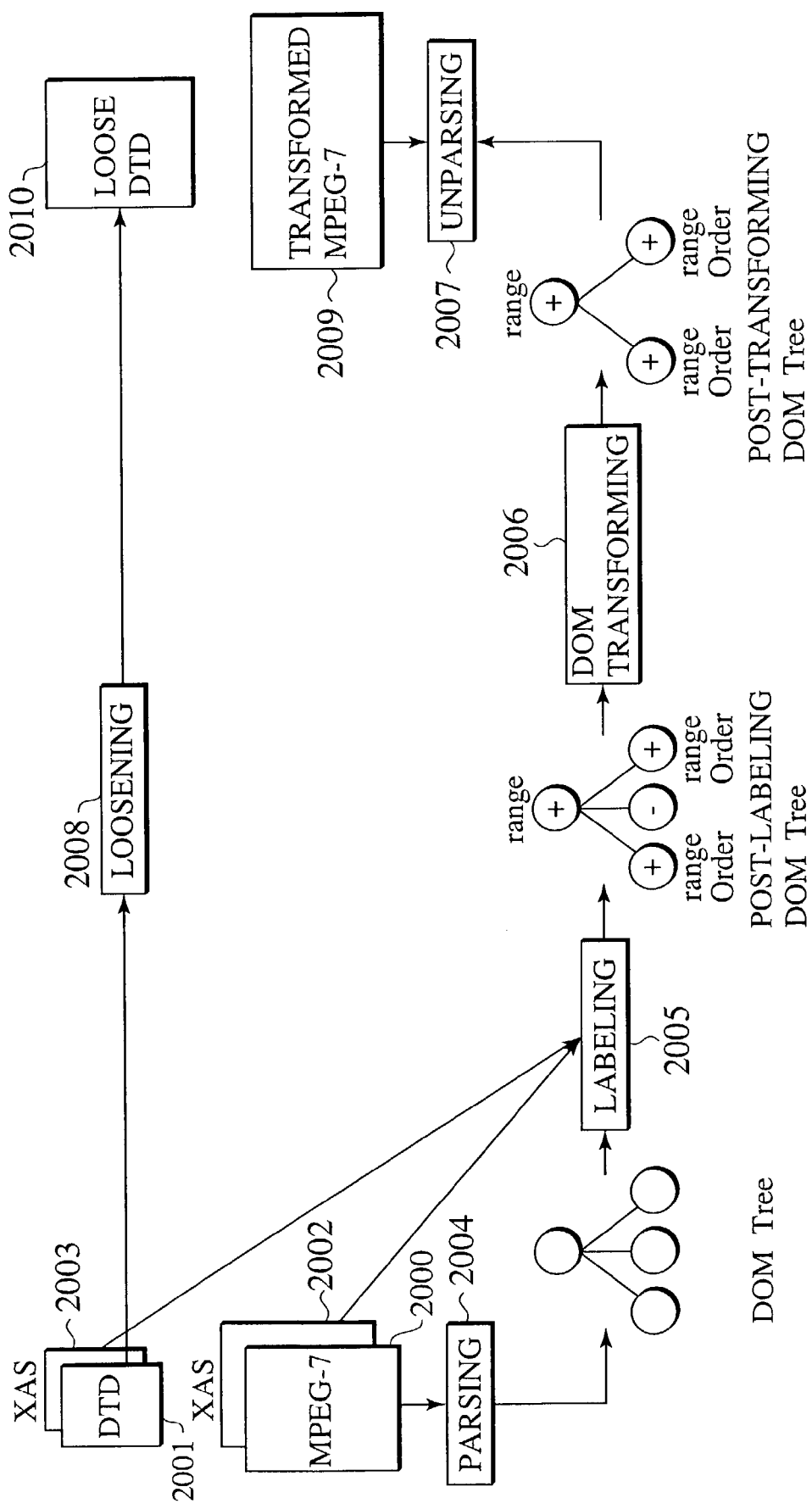
FIG. 19 is a schematic diagram illustrating a process of authorization performed by the authorization filter 1506 according to the second embodiment.

FIG. 19 shows a schematic diagram illustrating a process of authorization performed in the authorization filter 1506.

The role of the authorization filter 1506 is to perform access control of the contents dynamically in terms of time, by adopting the notion of access control regarding XHTML. As shown in FIG. 19, the authorization filter 1506 utilizes a set of materials, such as a meta-information 2000 to which access control is applied, a DTD 2001, to which access control is applied if required, and XAS 2002/2003 which describe the access privileges. Further, the authorization filter 1506 is configured with a parsing 2004 which parses the meta-information 2000 to a DOM tree, a labeling 2005 which labels the DOM tree according to the XAS 2002/2003, a DOM transforming 2006 which transforms the DOM tree using only the objects labeled as "permit", an unparsing 2007 which unparses the DOM tree to meta-information, and a loosening 2008 which loosens the DTD 2001.

In XAS 2002 and 2003, policies regarding the allowable time range for viewing of the content as well as the order of viewing the content, which are applied to each object, are described, in addition to the access privileges for each object in the DOM tree. At the labeling 2005, the "Sign" is added and the allowable time range for viewing the content as well as the order of viewing the content are reflected to the DOM tree. It is therefore feasible to reflect the policies regarding the allowable time range of viewing the content as well as the order of viewing the content, by such processes.

FIG. 22 shows an example of the XAS utilized in this embodiment.

As shown in FIG. 22, the allowable time range for viewing the content "Range" and the order of viewing the content "Order" are described in addition to "Subject", "Object" and "Sign". This means that the notion of the access control regarding XHTML is expanded to cover dynamic content in terms of time, without dividing the content that the access privileges are applied to objects. In the case shown in FIG. 22, when the user who is determined as "All" views the sequence specified by the URI of "www-.foo.com/sample.mp4", as specified by the <sign>, the user can access ("+" means access permitted, "−" means no access permitted) a time range specified by the <range>. In other words, the user can view the range starting from T00:01:13:14F30, which is specified by the "MediaTimePoint" of the "MediaTime" element, to the point decided by the "MediaDuration" PT27S2N30F, which indicates the allowable time range of viewing the content. Further, in this case, the order of viewing the content, i.e., a priority of scene specified by "score", which is an attribute of "priority", has to be followed.

If the user is determined as "Guest", in the same sequence of the URI, the user cannot access the range starting from T00:23:13, which is specified by the "MediaTimePoint" to the point decided by the MediaDuration" PT27S2N30F, which indicates a non-allowable time range of viewing the content as specified by the <sign>.

FIG. 23 shows an example of meta-information of MPEG-7 before the access control is applied. As shown in FIG. 23, MPEG-7 is configured with a "MediaInformation" and a "SegmentDecomposition". Related properties, e.g., a URI and an encoding law, are described in the "MediaInformation". An "AudioVisualSegment" which indicates the property of each scene, and a "MediaTime" which indicates the start-time and the total-time of the sequence are described in the "SegmentDecomposition". A "Keyword", which indicates the substance of each scene as a "PointOfView" and the "MediaTime" which indicates information of each scene in terms of time, i.e., the start-time "MediaTimePoint" and the total-time of media "MediaDuration" are described in the "AudioVisualSegment".

If the meta-information specified by the user who is determined as the "Guest" is MPEG-7 as shown in FIG. 23, the meta-information is processed by the authorization filter 1506 shown in FIG. 18, is then parsed to a DOM tree at the process of the parsing 2004 and is then labeled together with the XAS shown in FIG. 23. In this case, not only the "Sign" but also the "Range" and the "Order" are reflected. In other words, the first order of viewing the content is the range starting from T00:13:14F30 to the point decided by PT27S2N30F. On the other hand, since the user has been determined as the "Guest", the user cannot access the range starting from T00:01:23 to the point decided by PT17S16N30F. The situation is labeled to the DOM tree of MPEG-7 and the DOM tree is transformed by the permitted objects in the DOM transforming 2006. The DOM tree is unparsed to MPEG-7 in the unparsing 2007. The meta-information of MPEG-7 is thus reconfigured according to the access privileges of the user.

FIG. 24 shows an example of SMIL that are generated in the PDD generator 1503 based on the meta-information of MPEG-7 before access control is applied, which is shown in FIG. 23.

The SMIL is configured with a <layout> which specifies a viewing layout of the media, a <head> which indicates simple meta-information, e.g., the title of the media and name of content, and a <body> which indicates a URI for the media actually delivered and, a play-time, the end-time and the order of viewing. As shown in FIG. 24, the content is viewed from "0.0s" to "60.0s" before the access control is applied according to a <video> under the <body> element, and a <clip-begin> as well as a <clip-end> of the <audio> attribute.

FIG. 25 shows an example of the meta-information of MPEG-7 after the access control is applied according to the XAS shown in FIG. 22. As shown in FIG. 25, the <MediaDuration>indicates "PT15S" while it indicates "PT1M00S" as shown in FIG. 24, and it is understood that the <MediaDuration> is shortened to 15 seconds from 1 minute.

FIG. 26 shows an example of SMIL that are generated in the PDD generator 1503 based on the meta-information of MPEG-7 after the access control shown in FIG. 25 is applied.

As shown in FIG. 26, the <clip-end> attribute under the <body> element indicates "15.0s" while the <clip-end> indicates "60.0s" in FIG. 24 and it is understood that the access control is applied.

The user, i.e., the client terminal 1500 then transmits a request for the content to the content delivery server 1502 based on the PDD transmitted by the information delivery server 1501 together with the signature which is transmitted with the PDD and the user identifier.

As shown in FIG. 20, the content delivery server 1502 has an access controller 2100 (an authenticator), which is configured with a signature verification unit 2101, a viewing record check unit 2102, and an authorization filter 2103, a delivery processor 2104 and a signature processor 2105. Further, a contents storing unit 2106 is connected to the delivery processor 2104. The content delivery server 1502 needs to receive a request containing an ID of the most recently viewed scene, the user identifier and the signature.

The content delivery server 1502 first forwards the request to the signature verification unit 2101. The signature verification unit 2101 verifies whether the signature transmitted by the client terminal 1500 is issued at a legal entity, as well as the validity of the signature. If the signature is illegal, a process to reject the request is performed.

The viewing record check unit 2102 is located in the signature verification unit 2101 and traces the content which was viewed by the user most recently (i.e., the most recently viewed scene) in order to check that the user requests media according to the policy for the order of viewing the content. Since an ID of the content to be transmitted is reflected to the signature issued by the signature processor 2105, the viewing record check unit 2102 can check the most recently viewed scene by analyzing the signature received from the client terminal 1500. If the most recently viewed scene is illegal, a process to reject the request is performed.

The authorization filter 2103 verifies whether the user is allowed to access the requested content. Crucially, the authorization filter 2103 verifies whether or not the requested content is legal as regards the order of viewing, based on the most recently viewed scene, which is acquired by the viewing record check unit 2102. If the request is illegal, a process to reject the request is performed.

The delivery processor 2104 delivers the content requested by the user. The request examined in the access controller 2100 is handled as a legal request and the delivery processor 2104 generates a response message and prepares delivery of the content stored in the contents storing unit 2106.

The signature processor 2105 issues a signature which certifies that access control is applied at a legal entity. The information regarding the most recently viewed scene (which is utilized to determine whether the next request from the user, i.e. the client terminal 1500, satisfies the policy for the order of viewing the content) is reflected to the signature. In other words, the signature is newly issued by assuming that the content to be delivered is the most recently viewed scene. The most recently viewed scene can be assumed using the URI of the content to be delivered and the allowable time range for the user. Further, the signature processor 2105 sets a valid period for the signature and transmits the response message generated by the delivery processor 2104 and the signature with its valid period to the client terminal 1500.

Figure 21:
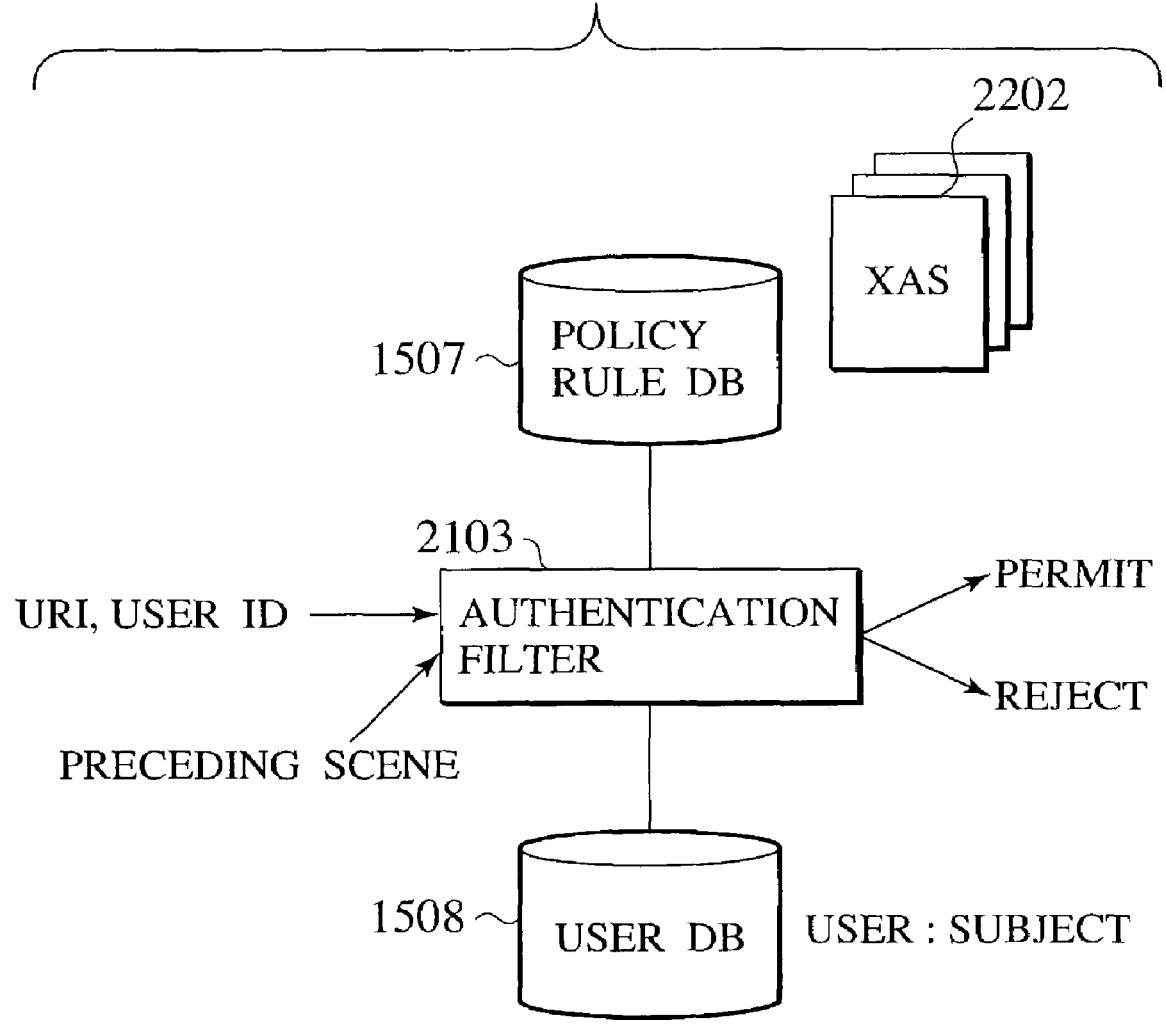
FIG. 21 is a block diagram of the authorization filter 2103 according to the second embodiment.

FIG. 21 shows a block diagram of the authorization filter 2103 shown in FIG. 20.

As shown in FIG. 21, the authorization filter 2103 is connected to the policy rule database 1507 and the user database 1508 of the information delivery server 1501 via the network. In the policy rule database 1507, an XAS 2202, which describes the access privileges of users for the stored contents, is stored. The URI, the user identifier, the "Range" and a "Preceding Scene", i.e., the most recently viewed scene, which is acquired by the viewing record check unit 2102 are forwarded to the authorization filter 2103. The authorization filter 2103 assigns the user to the "Subject" based on the user database 1508 and the forwarded user identifier.

Further, the authorization filter 2103 retrieves the XAS 2202 linked to the "Subject" based on the forwarded URI and the policy rule database 1507, and then checks the values of "Subject", "URI", "Range" and "Preceding Scene". The check of the "Preceding Scene" is performed by comparing the "order" of the "Preceding Scene" with the requested content.

Moreover, although the signature is transmitted every time by reflecting the "Preceding Scene" according to the request by the client terminal 1500 in order to check the order of viewing the content, synchronization can be achieved between the client terminal and the content delivery server without transmission of the "Preceding Scene" if the PDD can be shared by initiating a session in between.

FIG. 27 is a sequence chart showing a method to share the PDD between the client terminal and the content delivery server.

The client terminal 1500, the information delivery server 1501 and content delivery server 1502 are shown. When the information delivery server 1501 transmits the PDD to the client terminal 1500, the information delivery server 1501 adds a unique number (a deliverer identifier), which is generated using random numbers configured by approximately 64 bits so as to identify the PDD.

The client terminal 1500 transmits the unique number together with the request message to the content delivery server 1502 and the content delivery server 1502 forwards the received unique number to the information delivery server 1501. The information delivery server 1501 verifies the unique number and forwards the PDD, which the client terminal 1500 has stored, to the content delivery server 1502.

The content delivery server 1502 labels the PDD so as to distinguish the scene to be processed and therefore the content delivery server 1502 can trace the order of viewing the content at the client terminal 1500 up until then. Further, the signature and its valid period are added to the response message in order to prevent an illegal secondary access.

Moreover, the client terminal 1500 adds the unique number of the PDD and the signature to the request of the content. The content delivery server 1502 verifies that the signature, and the content previously transmitted was processed by itself. The content delivery server 1502 then recalls the PDD, which was previously used, and verifies the order of viewing the content.

(Modification)

The present invention is not limited to the second embodiment described above and the following modification can be achieved.

For instance, the content delivery server 1502 may have the function of the content delivery server 1001 described in the first embodiment. This means the media database 1009, which stores media data, the sequence information database 1008, which stores the sequence information, the scene searcher 1005 which retrieves an appropriate media data from the media database 1009 starting from a prescribed point, and the output unit 1006, which delivers the retrieved media data to the client terminal 1500.

In this case, the PDD includes the address of the beginning of the media data based on the access privileges of the user, and the elapsed time at the client terminal 1500 in the media control request. The scene searcher 1005 retrieves media data from a prescribed starting point as well as timing information based on the address and the elapsed time, which are included in the media control request. Incidentally, even in this case, information regarding the allowable time range and the order of viewing the content can still be included in the access privileges.

Further, in this case, the client terminal 1500 has a function to transmit the media control request to the content delivery server 1502 according to the PDD received from the information delivery server 1501. More specifically, the client terminal 1500 generates a scene identifier that specifies a point at the beginning of the media data based on the PDD received from the information delivery server 1501 and the media control request including the elapsed time. The client terminal 1500 then transmits the generated media control request to the content delivery server 1502.

The content delivery server 1502 can therefore synchronously transmit the configured digest data based on the access privileges of each user to the client terminal 1500. At this point in time, even if a plurality of content delivery servers (content delivery server 1502) exist, the content transmitted by the respective content delivery servers can be viewed continuously by specifying a start-time that differs from each of the respective content delivery servers.

In addition, in the above described modification, although the client terminal 1500 transmits the request for delivery of media data to the content delivery server 1502 based on the PDD received from the information delivery server 1501, for instance, the PDD generated by the information delivery server 1501 may be directly transmitted to the content delivery server 1502. The content delivery server 1502 may transmit media data to the client terminal 1500 according to the received PDD.

Incidentally, in this embodiment, although the information delivery server 1501 and content delivery server 1502 are independently configured, the servers may be configured in the same server hardware.

Third Embodiment (Configuration of the Information Delivery System)

Figure 28:
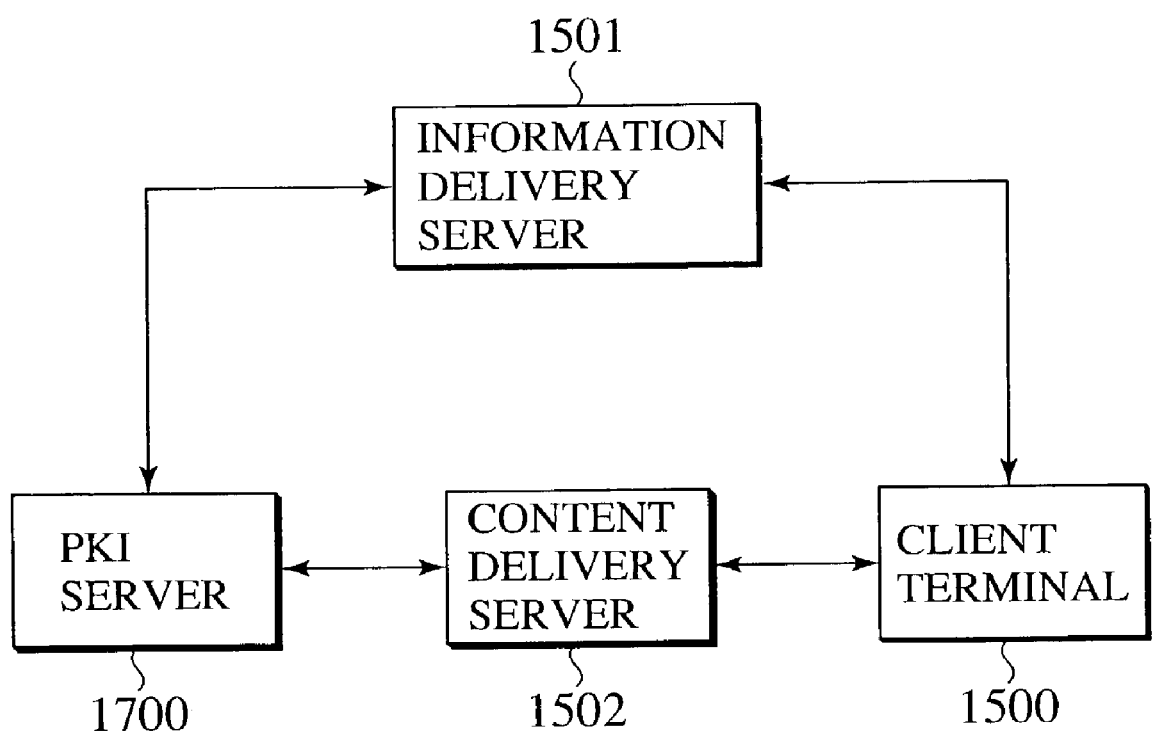
FIG. 28 is a block diagram of the information delivery server according to the third embodiment.

Hereafter, a third embodiment of the present invention will be described with reference to associated drawings. FIG. 28 shows a block diagram of the information delivery system according to this embodiment.

In this embodiment, a PKI server 1700 is deployed in addition to the above described configuration of the information delivery system. In FIG. 28 the client terminal 1500, the information delivery server 1501, the content delivery server 1502 and the PKI server 1700 are shown, and they are interconnected via a network.

The role of the PKI server 1700 is to provide a PKI service. The PKI server 1700 is a server issuing a public key as well as a secret key, registering the public key and distributing the public key as well as the secret key. Specifically, the PKI server 1700 issues a secret key of a signature and distributes the secret key to the information delivery server 1501 and issues a public key that pairs with the secret key and distributes the public key to the content delivery server 1502.

The role of the information delivery server 1501 is to transmit the PDD to the client terminal 1500. The PDD is generated based on the meta-information of content which is reconfigured according to the access privileges of a user that are defined by a service provider. Further, the information delivery server 1501 requests registration of the key to the PKI server 1700 and receives the secret key from the PKI server 1700. The information delivery server 1501 attaches the signature to the PDD using the secret key and delivers the PDD together with a server ID including an IP address.

Moreover, the information delivery server 1501 has the function of adding content delivery control information (a viewing mode), which indicates parameters regarding the delivered content to be viewed at the client terminal 1500. For instance, the size of an image, the resolution and a video frame rate are included in the content delivery control information.

The role of the content delivery server 1502 is to receive a request that includes the signature and the server ID from the client terminal 1500 and then transmits audio/video data to the client terminal 1500. Further, the content delivery server 1502 requests the public key for the information delivery server 1501 from the PKI server 1700 and receives the public key. When the content delivery server 1502 requests the public key for the information delivery server, an actual server is specified using the server ID if the information delivery server 1501 is configured by a plurality of servers. The content delivery server 1502 verifies a request from the client terminal 1500 using both the received public key for the information delivery server 1501 and the signature contained in the request from the client terminal 1500.

(Process Regarding the Information Delivery System)

Figure 29:
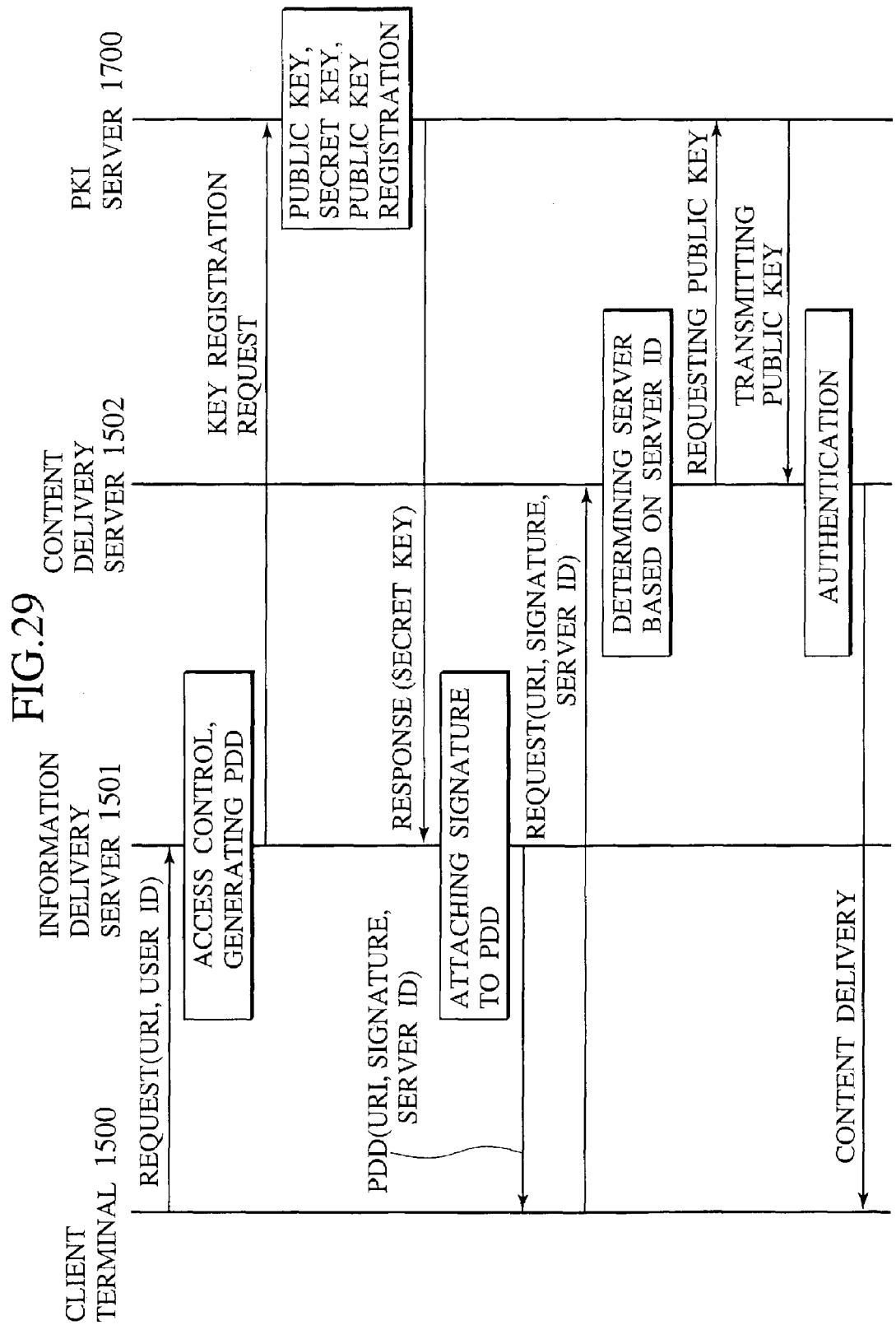
FIG. 29 is a sequence chart showing a process regarding the information delivery system according to the third embodiment.

FIG. 29 is a sequence chart showing a process regarding the information delivery system according to this embodiment. The client terminal 1500 first requests the PDD from the information delivery server 1501. At this point in time, the client terminal 1500 adds the URI of the content to be retrieved and the user identifier to the request. The information delivery server 1501 applies access control to meta-information according to the received URI and user identifier so as to generate the PDD.

The information delivery server 1501 then enters a signature-adding step to add the signature used for certifying that access control is applied by the information delivery server 1501. In the signature-adding step, the information delivery server 1501 requests registration of a public key and a secret key from the PKI server 1700. The information delivery server 1501 may issue the public key as well as the secret key (a key issuer) and request registration from the PKI server 1700. Besides, the PKI server 1700 may issue the keys for the information delivery server 1501 and register them.

The PKI server 1700 registers the public key and the secret key and forwards the secret key to the information delivery server 1501. The information delivery server 1501 may request the registration of the keys upon reception of the request from the client terminal 1500, or upon the key expiry if the valid period of the keys is set. The information delivery server 1501, as soon as the secret key is received, calculates the hush value of URI in the PDD using the secret key and attaches a signature using the hash value.

Further, the information delivery server 1501 adds the server ID which identifies the information delivery server to the PDD, and then transmits the PDD to the client terminal 1500. The client terminal 1500 requests delivery of content from the content delivery server 1502 according to the received PDD. The URI of the content, the signature and the server ID are included in the request transmitted by the client terminal 1500. The content delivery server 1502 recognizes that the PDD received from the client terminal 1500 was transmitted by the information delivery server 1501 and requests the public key for the information delivery server 1501 from the PKI server 1700. The PKI server 1700 forwards the public key for the information delivery server 1501 to the content delivery server 1502 according to the request.

The content delivery server 1502 verifies the request from the client terminal 1500 using the received public key and the signature contained in the request. The content delivery server 1502 transmits the content if the request is verified.

Figure 30:
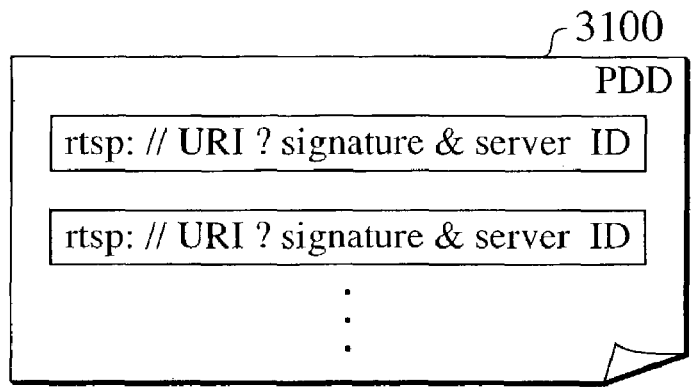
FIG. 30 is an example of the presentation description data which is transmitted by an information delivery server to a client terminal in the third embodiment.

FIG. 30 shows an example of the PDD, which is transmitted by the information delivery server 1501 to the client terminal 1500. As shown in FIG. 30, it is assumed that in this embodiment, the PDD 3100 is configured by the RTSP requests. In the RTSP request, the signature attached to the hash value of the URI and the server ID for identifying the information delivery server are included in addition to the URI of the content. It is to be noted that an "http-get" is utilized for the PDD 3100 in this embodiment.

The information required for verification of the request can be simultaneously transmitted in a case where the client terminal 1500 transmits the RTSP request shown in the PDD 3100 without any changes. Further, besides the signature and the server ID, information for viewing media and preventing an illegal RTSP request, which may be transmitted if the PDD is illegally copied, can be added to the RTSP request. In this case, this information is also hashed and the signature is attached to the hashed value, together with the URI and the server ID. Incidentally, the information for viewing media means, for instance, a value of QoS, an ID indicating the type of a client terminal and the type of browser used in the client terminal. As a result, the content delivery server 1502 is able to change the method of delivering the media appropriately, according to the received information and then transmit the content to the client terminal 1500.

Regarding the prevention of the illegal RTSP request, a legal RTSP request transmitted by the client terminal 1500 can be stolen by an illegal user and the illegal user can transmit the same "stolen" RTSP request to the information delivery server 1501. In order to prevent this situation, for instance, the IP address of the client terminal or the identification number of terminal "UIM" (a client terminal identifier) may be utilized to identify the user more accurately. The content delivery server 1502 can therefore detect an illegal RTSP request based on this information.

Figure 31:
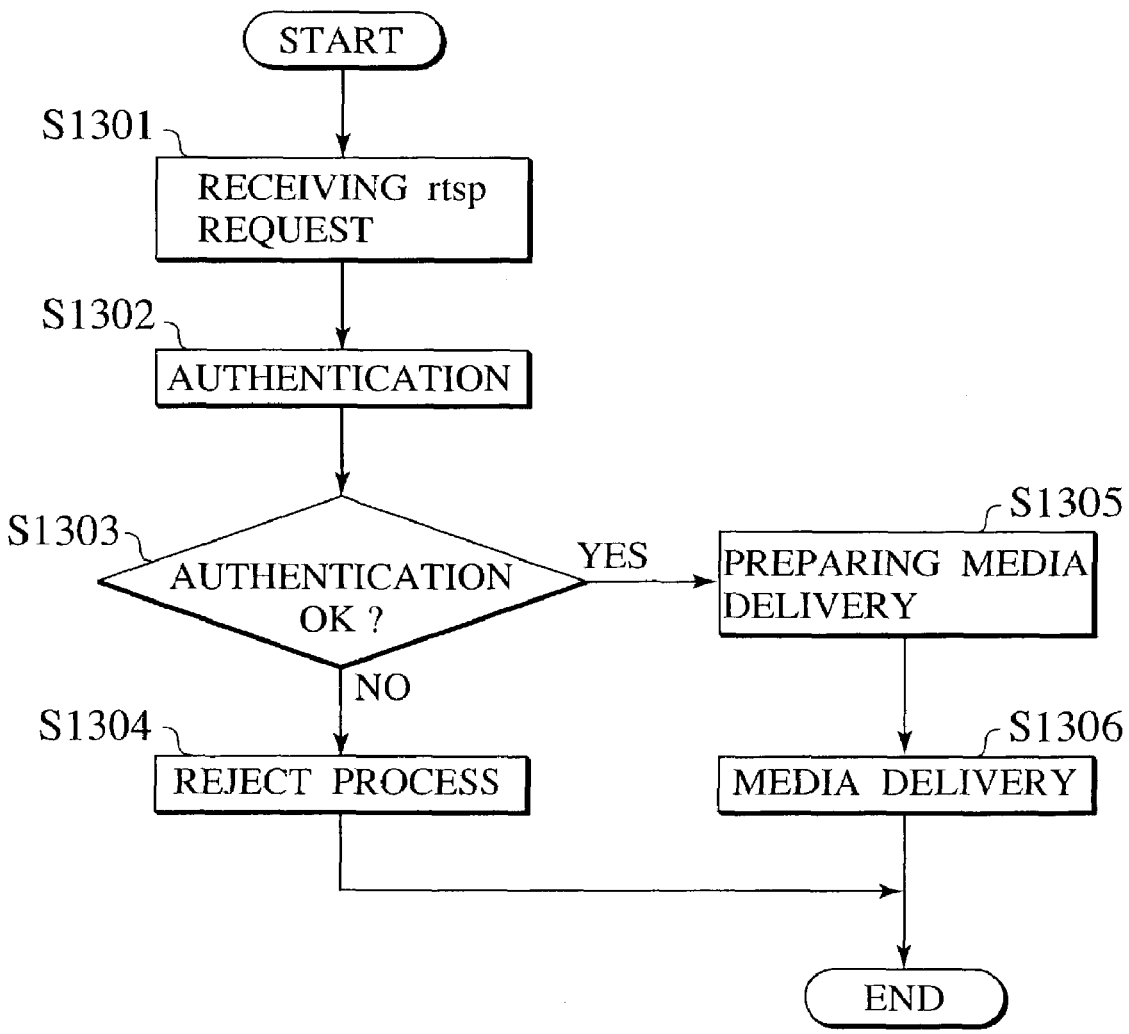
FIG. 31 is a flowchart showing a process regarding the content delivery server according to the third embodiment.

FIG. 31 is a flowchart showing a process regarding the content delivery server according to this embodiment.

As shown in FIG. 31, the process is configured with a RTSP reception step S1301, an authentication step S1302, a media delivery preparation step S1305, a media delivery step S1306, and a reject step S1304.

Firstly, at the RTSP reception step S1301, the content delivery server 1502 receives the RTSP request from the client terminal 1500 and recognizes the information required for the authentication of the user and delivery of the media.

At the authentication step S1302, the content delivery server 1502 verifies whether the RTSP request is legal or not in cooperation with the PKI server 1700 using the signature, the server ID, and information regarding countermeasures for a reply attack, if it is available. If the RTSP request is legal, the process is shifted to the media delivery preparation step S1305. On the other hand, if the RTSP request is illegal, the process is shifted to the reject step S1304. At the media delivery preparation step S1305, the content delivery server 1502 retrieves the media specified by the RTSP request and prepares delivery of the media.

If information requesting a change in delivering method for the media is included in the RTSP request, the size of the media or a frame rate is changed in the media delivery preparation step S1305. At the media delivery step S1306, the content delivery server 1502 delivers the media prepared at the media delivery preparation step S1305 to the client terminal 1500 according to RTSP commands. At the reject step S1304, the content delivery server 1502 determines that the RTSP request is illegal and transmits an error message to the client terminal 1500.

Figure 32:
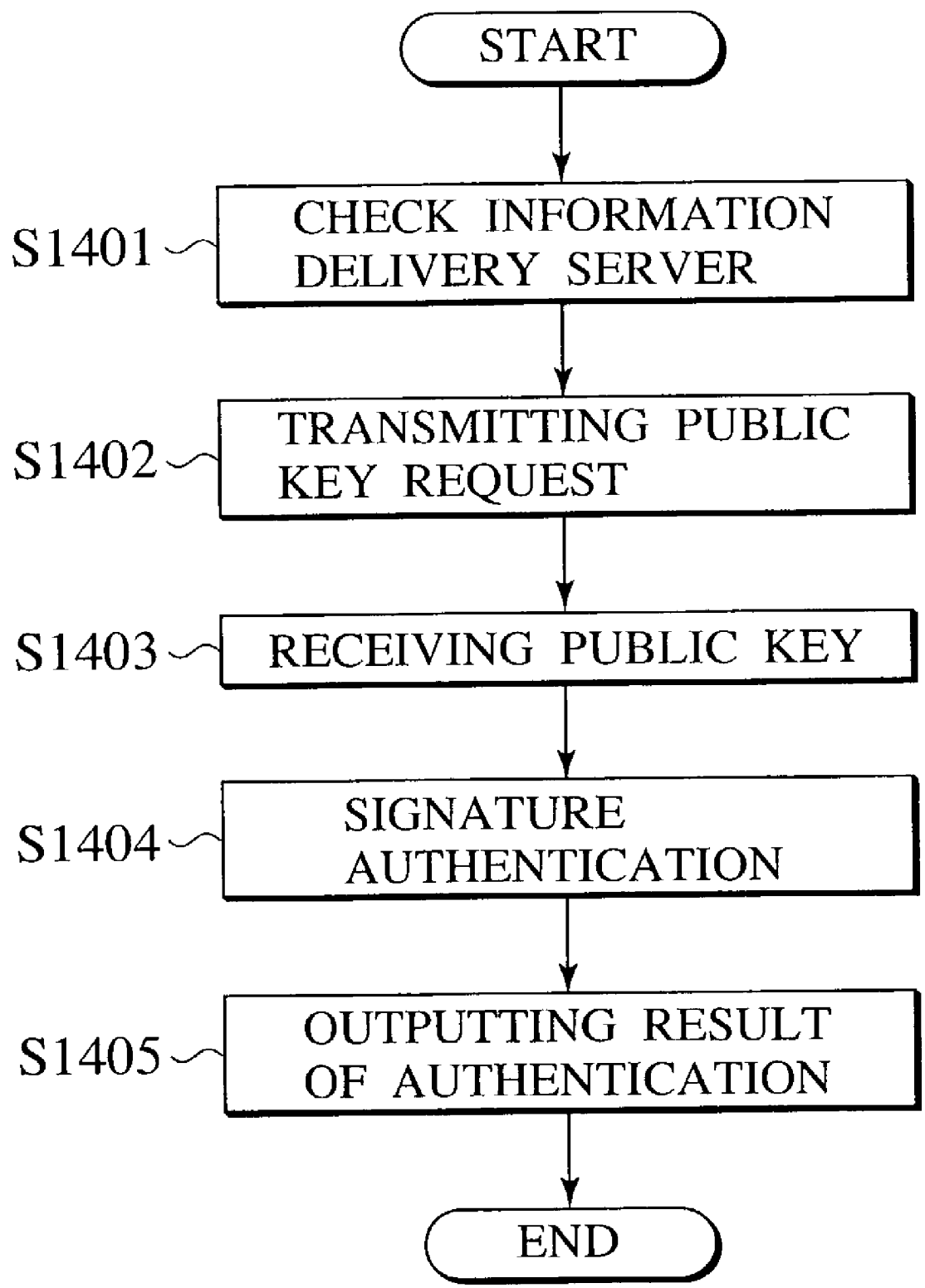
FIG. 32 is a flowchart showing a process regarding authentication of a user according to the third embodiment.

FIG. 32 is a flowchart showing the process of authentication of a user, which is performed in the content delivery server 1502.

As shown in FIG. 32, the process of the authentication is configured with an information delivery server check step S1401, a public key requesting step S1402, a public key reception step S1403, a signature authentication step S1404 and an authentication result output step S1405.

At the information delivery server check step S1401, the content delivery server 1502 determines the information delivery server, based on checking which server issued the signature contained in the RTSP request. At the public key requesting step S1402, the content delivery server 1502 generates a public key request, which includes a URI of the determined information delivery server, and transmits it to the PKI server 1700.

At the public key reception step S1403, the content delivery server 1502 receives the public key from the PKI server 1700 and checks whether it is legal or not. At the signature authentication step S1404, the content delivery server 1502 verifies the received RTSP request using the signature and the public key. At the authentication result output step S1405, the content delivery server 1502 outputs an authentication result, which determines whether the RTSP request is legal or not based on the verification performed at the signature authentication step S1404.

(Effects of the Information Delivery System)

According to the information delivery system of this embodiment, the content delivery server 1502 can verify that the client terminal 1500 follows access control applied by the information delivery server 1501. Further, it is feasible to control the method of delivery (i.e., the size of media, the frame rate, etc.) at the content delivery server 1502 by adding information to control the delivery of media per the RTSP request. It is also feasible to verify whether the request is generated by the same user by adding information to the RTSP request which links the source and sink of the request.

(Modification)

In this embodiment, the following modification can be made. For instance, as shown in FIG. 33, an illegal request (i.e., reply attack) may be detected in the authentication process.

Figure 33:
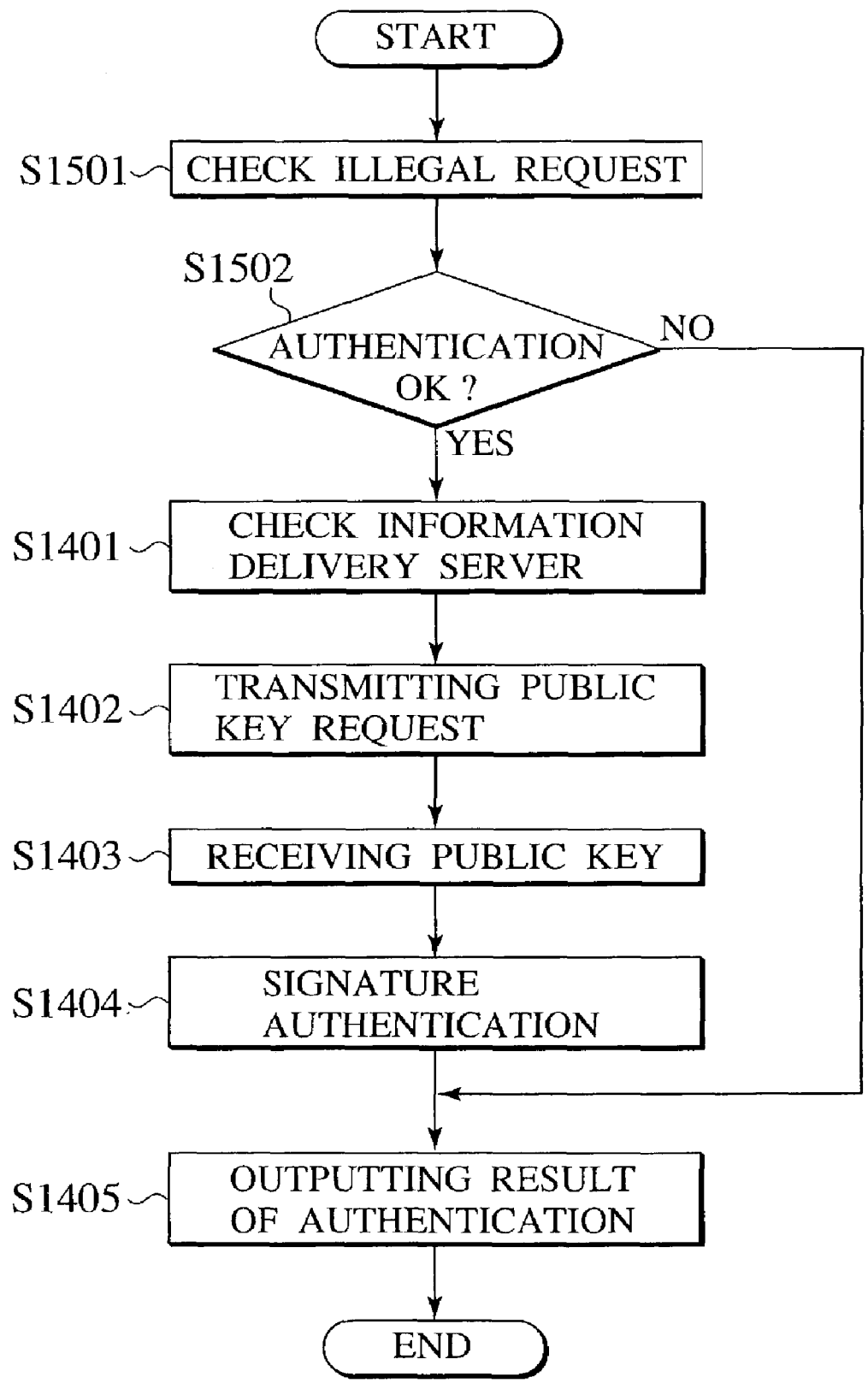
FIG. 33 is a flowchart showing a process regarding authentication of a user according to modification of the third embodiment.

That is, as shown in FIG. 33, an illegal request check step S1501 is added before the information delivery server check step S1401. At the illegal request check step S1501, whether the request is illegal or not is checked based on the information regarding countermeasures for an illegal request, which is added to the RTSP request, and the user identifier received when a session is initiated according to the RTSP request. The process is shifted to the information delivery server check step S1401 if the request is legal. On the other hand, the process jumps to the authentication result output step S1405 if the request is illegal.

Effects of the Present Invention

According to the present invention, it is capable of jumping to an appropriate scene by transmitting a single request to control delivered media from a client terminal to an information delivery server during a playback of media data. Further, it is also capable of generating a digest of a dynamic content in terms of time automatically according to the access privileges of a user defined by the server and delivering information accurately based on the attributes of the user.

The invention has been described in detail by referring to the embodiments. It is obvious to those skilled in the art that the invention is not restricted to the embodiments mentioned above. The invention may be carried out as a corrected or modified embodiment not departing from the gist and scope specified by the scope of the claims of the patent. Therefore, the description of this specification aims at the representation of examples but does not have any limitation on the present invention.

What is claimed is:

1. An information delivery system for delivering media data such as audio and video to a client computer comprising:
    a media storing memory that stores the media data and meta-information;
    a sequence information storing unit that stores sequence information for specifying an address at beginning of the media data;
    a media control request generator that generates a media control request, which requests delivery of the media data, includes a scene identifier, a current scene being viewed and a relative time distance indicating a time from a scene currently being viewed to a time of requested media data, wherein the scene identifier includes a playtime which specifies an elapsed time of viewing media;
    a searcher executes the media control request in the sequence information using a sum of a current scene number and a value of the relative time distance;
    a retriever that receives the media control request to verify the sequence information based on the received media control request and retrieves the media data starting from a prescribed point according to a result of the verification of the sequence information, wherein the verification determines whether a playtime exists or not in the sequence information, the retriever further retrieving the media data based on an address linked to a detected text data, and
    wherein the meta-information, which links text data describing a digest of a scene to an address of the scene, is included in the sequence information, a scene keyword, which specifies a requested scene to view, is included in the media control request; and
    a deliverer that delivers the retrieved media data to the client computer.

2. The information delivery system according to claim 1, the retriever detects the text data based on received scene keyword.

3. An information delivery method for delivering media data such as audio and video to a client terminal, comprising:
    storing the media data and meta-information in a media storing unit;
    storing sequence information for specifying an address at beginning of the media data in a sequence information storing unit;
    generating a media control request at the client terminal, which requests delivery of the media data, includes a scene identifier, a current scene being viewed, and a relative time distance indicating a time from a scene currently being viewed to a time of requested media data, wherein the scene identifier includes a playtime, which specifies an elapsed time of viewing media;

executing the media control request in the sequence information using a sum of a current scene number and a value of the relative time distance;

receiving the media control request at an information delivery server to verify the sequence information based on the received media control request;

retrieving the media data from the media storing unit starting from a prescribed point according to a result of verification of the sequence information, the verification determines whether the playtime exists or not in the sequence information, said retrieving the media data also based on an address linked to detected text data, and wherein the meta-information, which links text data describing a digest of a scene to an address of the scene, is included in the sequence information, and a scene keyword, which specifies a requested scene to view, is included in the media control request, and; and delivering the retrieved media data to the client terminal.

4. The information delivery method according to claim 3, wherein the text data based on a received scene keyword is detected.

5. An information delivery server for delivering media data such as audio and video to a client terminal comprising:

a media storing memory that stores the media data and meta-information;

a sequence information storing unit that stores sequence information for specifying an address at beginning of the media data;

a media control request generator that generates a media control request which requests delivery of the media data, includes a scene identifier, a current scene being viewed and a relative time distance indicating a time from a scene currently being viewed to a time of requested media data, wherein the scene identifier includes a playtime which specifies an elapsed time of viewing media;

a searcher executes the media control request in the sequence information using a sum of a current scene number and a value of the relative time distance;

a retriever that receives the media control request to verify the sequence information based on the received media control request and retrieves the media data starting from a prescribed point according to a result of the verification of the sequence information, wherein the verification determines whether a playtime exists or not in the sequence information, the retriever further retrieving the media data based on an address linked to detected text data, and wherein the meta-information, which links text data describing a digest of a scene to an address of the scene, is included in the sequence information, a scene keyword, which specifies a requested scene to view, is included in the media control request; and a deliverer that delivers the retrieved media data from the server to the client terminal.

6. The information delivery server according to claim 5, the retriever detects the text data based on received scene keyword.

* * * * *